Figure 1:
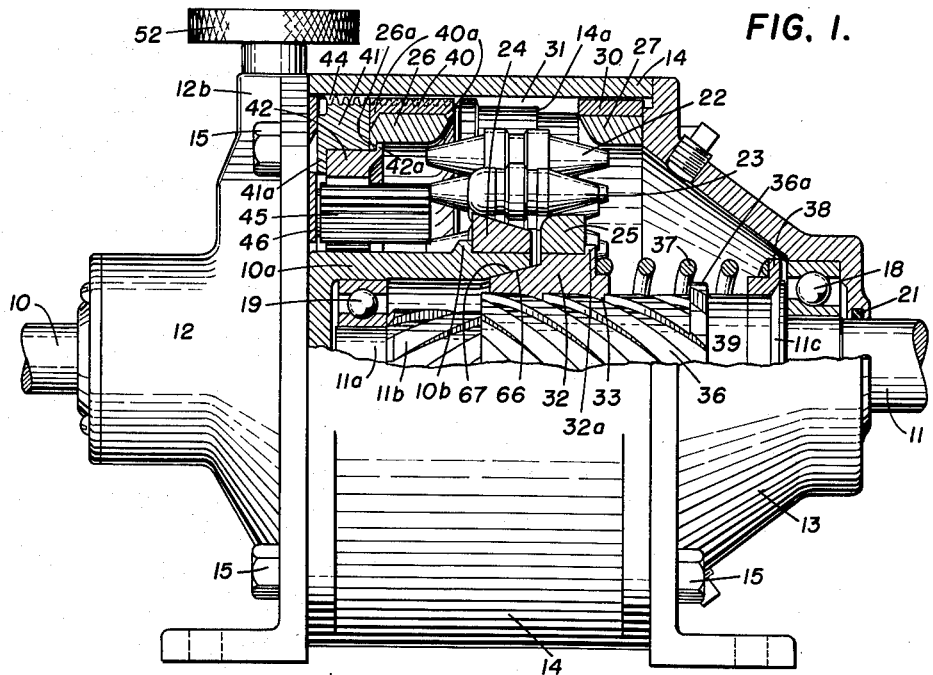

March 7, 1961     D. A. ELKINS     2,973,671

FRICTION DRIVE, POWER TRANSMISSION MECHANISM

Filed Oct. 2, 1958     7 Sheets-Sheet 1

INVENTOR.
DOUGLAS A. ELKINS

ATTORNEYS

March 7, 1961 D. A. ELKINS 2,973,671
FRICTION DRIVE, POWER TRANSMISSION MECHANISM
Filed Oct. 2, 1958 7 Sheets-Sheet 2

INVENTOR.
DOUGLAS A. ELKINS
ATTORNEYS

March 7, 1961   D. A. ELKINS   2,973,671
FRICTION DRIVE, POWER TRANSMISSION MECHANISM
Filed Oct. 2, 1958   7 Sheets-Sheet 3
FIG. 6.
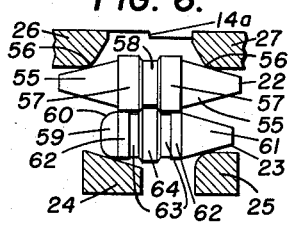
FIG. 8.
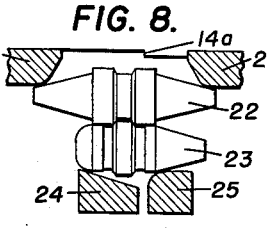
FIG. 10.
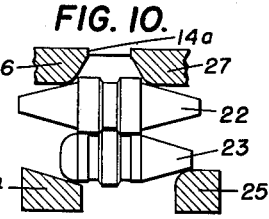
FIG. 7.
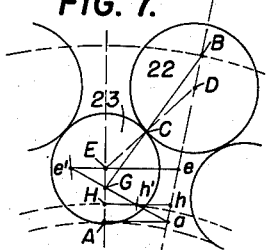
FIG. 9.
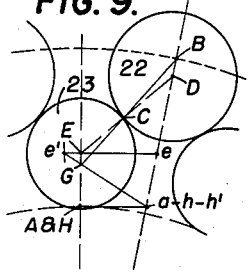
FIG. 11.
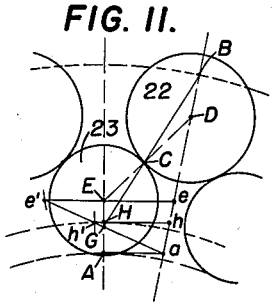
FIG. 12.
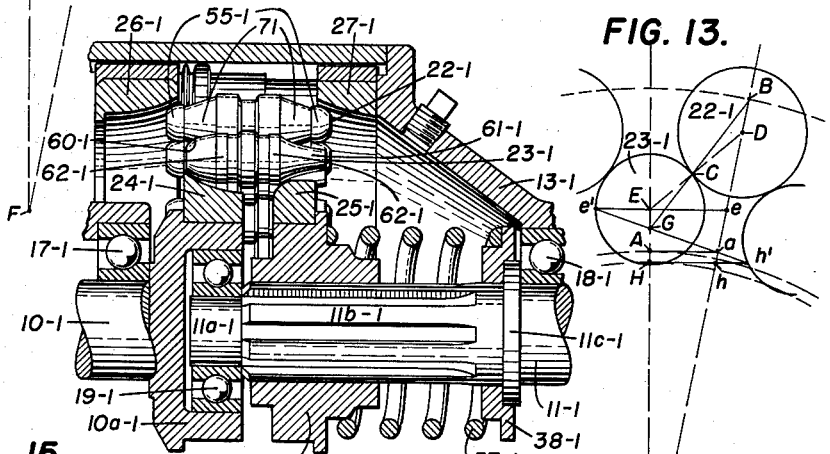
FIG. 13.
FIG. 15.
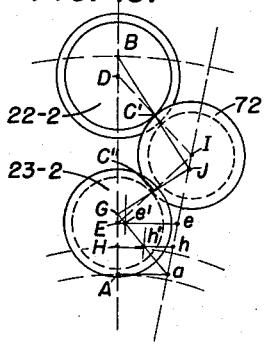
FIG. 14.
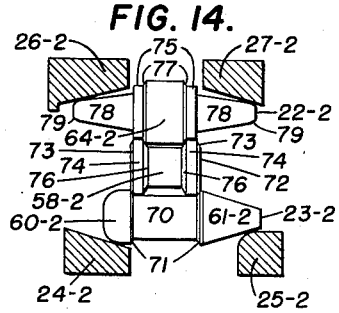
INVENTOR.
DOUGLAS A. ELKINS
BY
ATTORNEYS March 7, 1961 D. A. ELKINS 2,973,671
FRICTION DRIVE, POWER TRANSMISSION MECHANISM
Filed Oct. 2, 1958 7 Sheets-Sheet 4

INVENTOR.
DOUGLAS A. ELKINS
ATTORNEYS

March 7, 1961  D. A. ELKINS  2,973,671
FRICTION DRIVE, POWER TRANSMISSION MECHANISM
Filed Oct. 2, 1958  7 Sheets-Sheet 5

INVENTOR.
DOUGLAS A. ELKINS
ATTORNEYS

INVENTOR.
DOUGLAS A. ELKINS
ATTORNEYS

United States Patent Office 2,973,671
Patented Mar. 7, 1961

2,973,671

FRICTION DRIVE, POWER TRANSMISSION MECHANISM

Douglas A. Elkins, 1875 E. 21st S., Salt Lake City, Utah

Filed Oct. 2, 1958, Ser. No. 765,713

47 Claims. (Cl. 74—796)

This invention relates to power transmission mechanisms, and is concerned particularly with those of friction drive, variable ratio type, although those of fixed ratio type are not excluded from the scope of the invention.

It is my purpose to improve the efficiency of variable ratio power transmissions of friction type, and to do this by very simple and compact mechanism capable of transmitting exceptionally high torque and also capable of unusually wide variation in drive ratios for any given size unit.

Inherent power loss in friction type, variable ratio transmissions is due largely to the fact that, in such transmissions, there is a variation in velocity over the friction driving surfaces. Only within an infinitesimally small area of contact between such friction driving surfaces can such surfaces normally move in the same direction and at the same velocity at any given instant. But, in order to effectively transmit power through a friction contact, it is essential that this contact have finite area. Thus, the motion transmitted by any friction contact of practical significance is a mean of the various velocities involved over the area of contact. Under such condition, there must either be slipping between the contacting surfaces, or a compensating elastic distortion of such surfaces. Either slipping or distortion is accompanied by an absorption of energy.

There are several ways in which this loss of energy may be reduced. For example, the variation in velocity over a given area of contact between friction members may be decreased, this being accomplished either by making the over-all dimensions of such friction members greater, or by decreasing the range of ratio variation. Neither of these expedients is desirable, however, because size is increased unduly, on the one hand, while range of ratio is sacrificed unduly, on the other hand. Again, one or both of the friction members may be provided with a relatively soft pliable surface capable of withstanding considerable distortion. But this largely defeats its own purpose. Lower contact pressures must be used, thereby requiring more extensive areas of contact for a given load.

Another way to reduce such loss of energy is to decrease the area of friction contact. This can be accomplished by using very high contact pressures, and is desirable, because, as the area of contact becomes smaller, the smaller the slippage or distortion encountered and the higher the contact pressure which can be used without danger of fatigue failure of the contacting surfaces. Thus, the effect is cumulative. But, heretofore, there has not been sufficient reduction in size of an area of contact to make possible effective utilization of such high contact pressures.

Loss of energy may also be reduced by distributing the load between multiple friction contacts, thereby reducing the area required for any particular contact. This has not been practical as heretofore carried out, because of excessive duplication of mechanism.

The principal object of this invention is to effectively provide multiple, friction, driving contacts in a friction drive transmission, without excessive duplication of mechanism, thereby achieving a desirable reduction in the area of individual friction contacts.

Another object is to take full advantage to be gained from reduced area of respective friction contacts by using maximum possible contact pressures, while yet providing for variation of such pressures in accordance with the torque being transmitted, so that maximum efficiency of operation will be achieved and minimum wear incurred.

The provision of a direct drive connection between driving and driven shafts and the maximum use of rolling, rather than sliding, contacts are other outstanding objects.

In achieving these purposes and objects of the invention, I employ a translating, compression column of rolling elements, arranged in multilayer, endless loop formation, for transmitting energy from a drive member to a driven member. The drive member and the driven member each comprise a smooth surfaced wheel defining, in part, a raceway for the column of rolling elements.

The roller column thus provided constitutes an antifriction device, with minimum sliding contact. In preferred constructions, the force with which the rolling elements contact one another and the smooth surfaces of drive and driven wheels varies in accordance with the torque being transmitted. Under light load, the rolling elements do not bear heavily on one another, nor on the drive and driven wheels. Yet, the bearing pressure increases proportionately to the applied torque, and, unless designed not to do so, the transmission will fail mechanically before it will slip.

An outstanding and unusual feature of the invention resides in the fact that a direct drive connection is inherently provided between the input and output shafts.

In summarizing the advantages of the friction drive transmission mechanism of the invention, it may be said that positive drive is obtained with smaller size for any given range, that higher than normal capacity and efficiency are achieved, in that wear and power losses are reduced to a minimum, and that direct drive connection is provided in a structurally simple manner and as an incident of the normal construction.

The above and additional objects and features of the invention are discussed in detail in connection with the presently preferred embodiment, and variations thereof, illustrated by way of example in the accompanying drawings.

Figure 2:
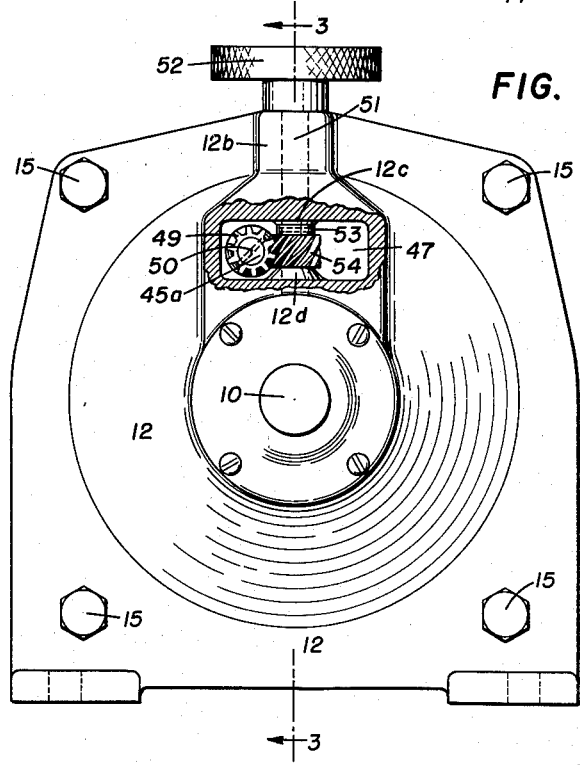
Figure 3:
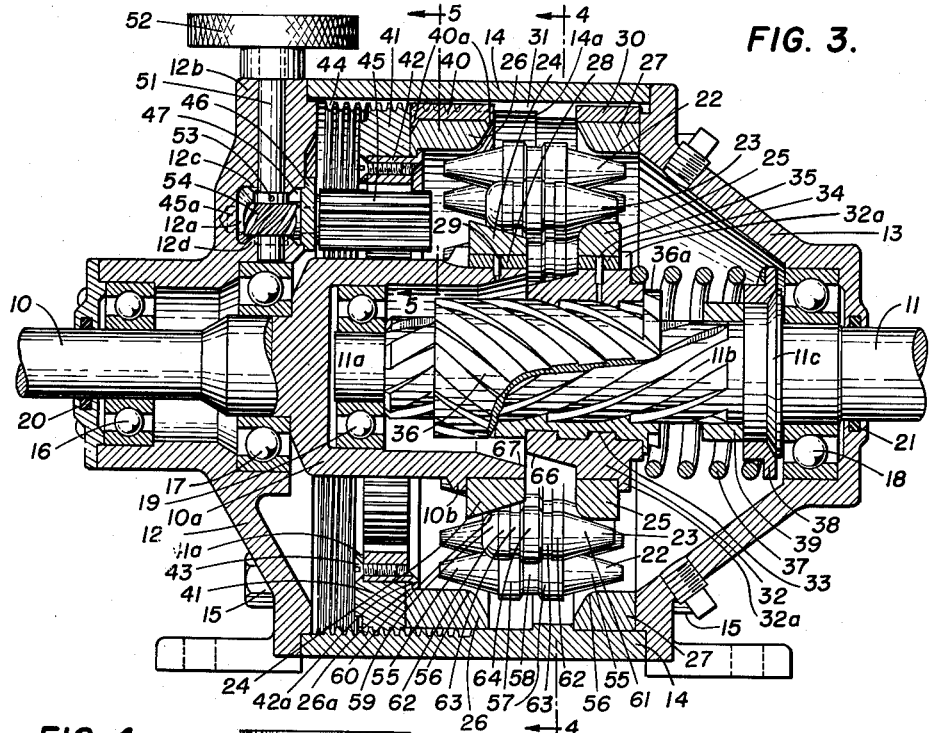
Figure 4:
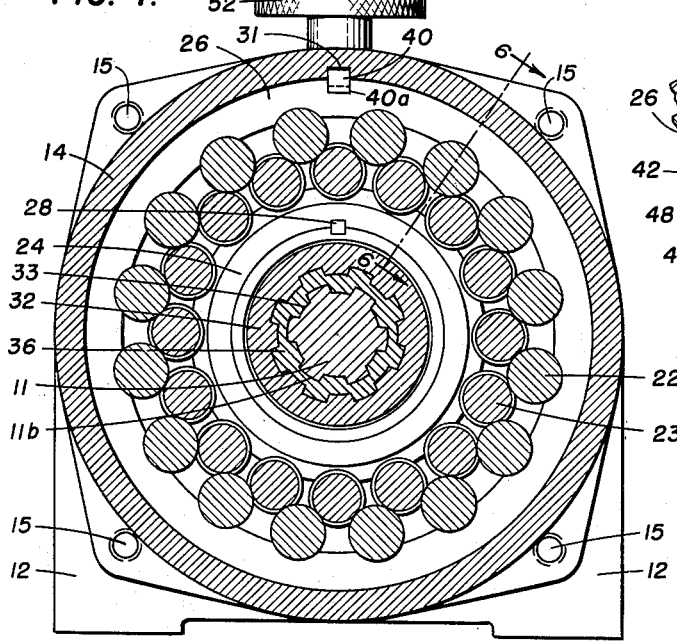
Figure 5:
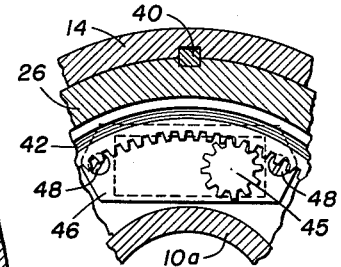
Figure 16:
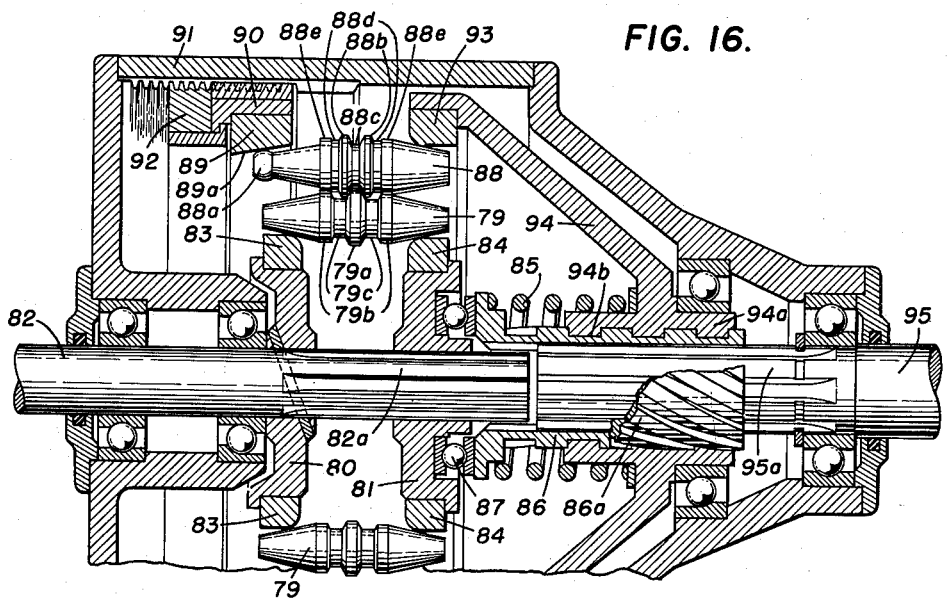
Figure 17:
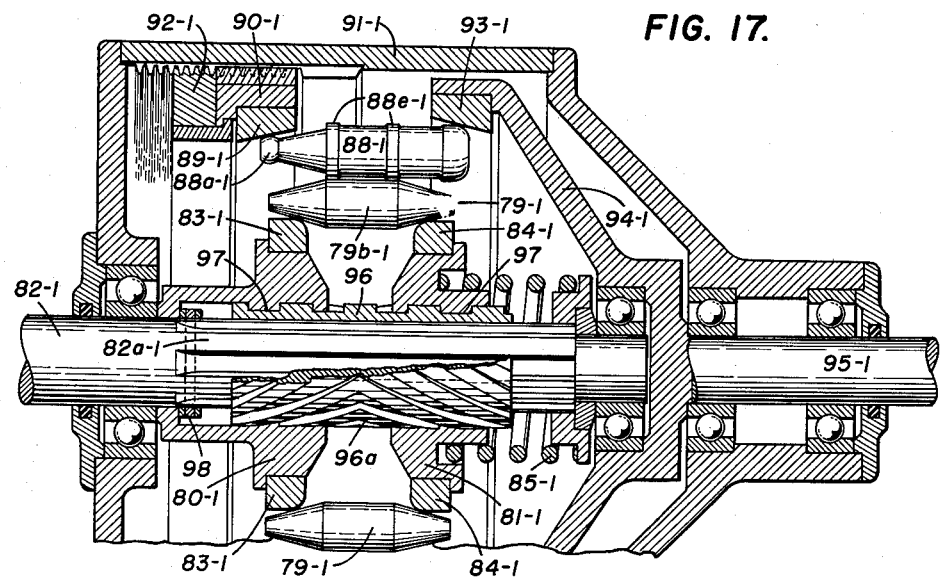
Figure 18:
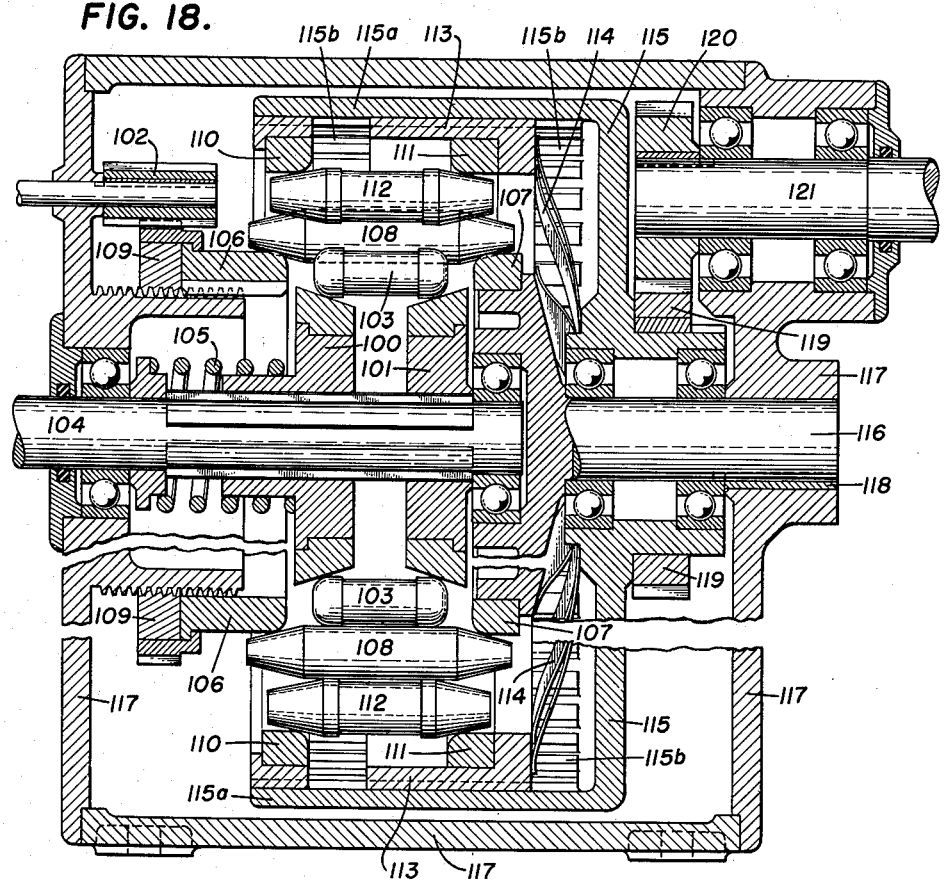
Figure 19:
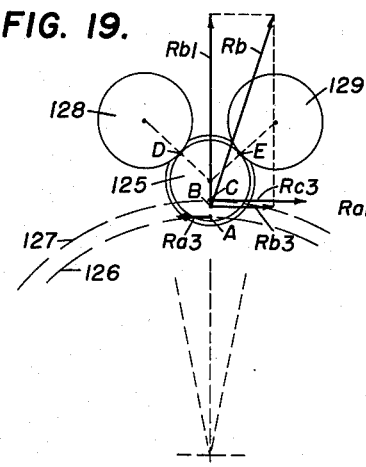
Figure 20:
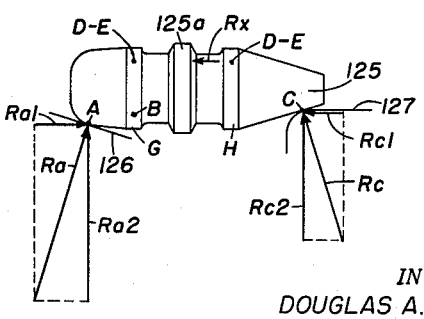
Figure 21:
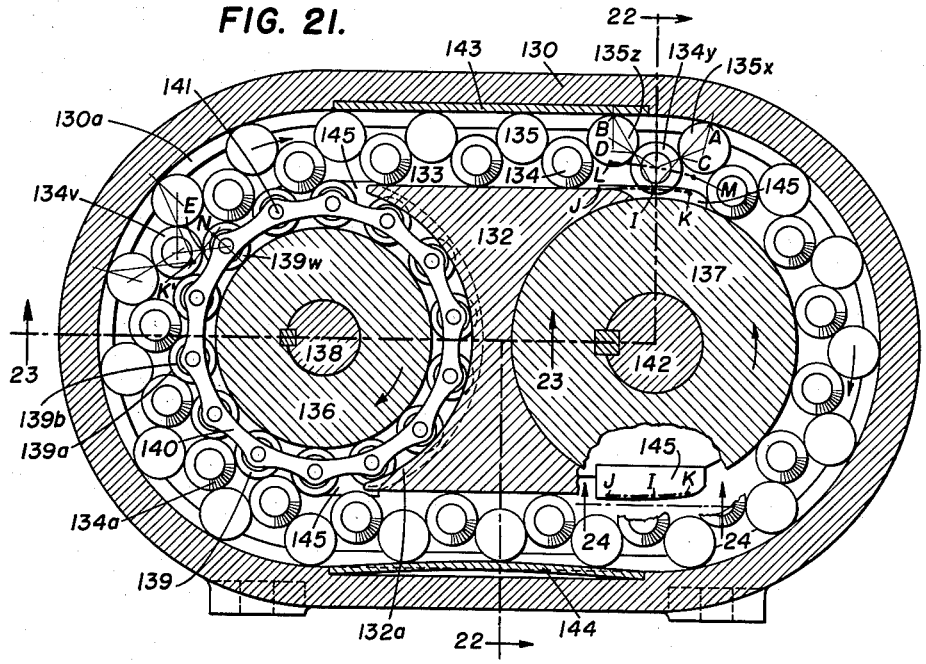
Figure 22:
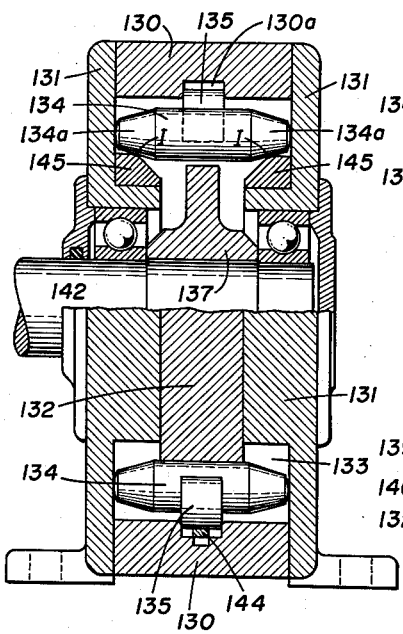
Figure 23:
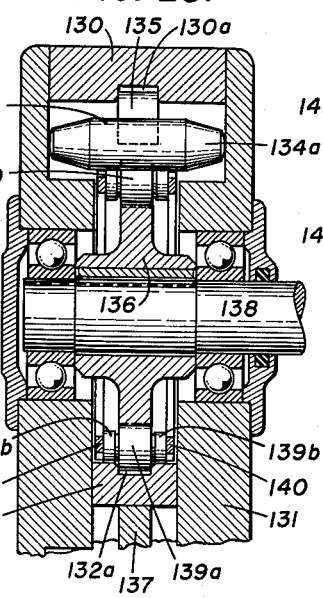
Figure 24:
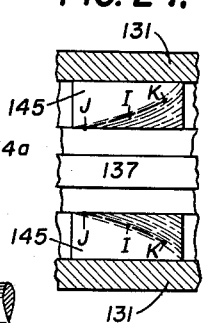
Figure 25:
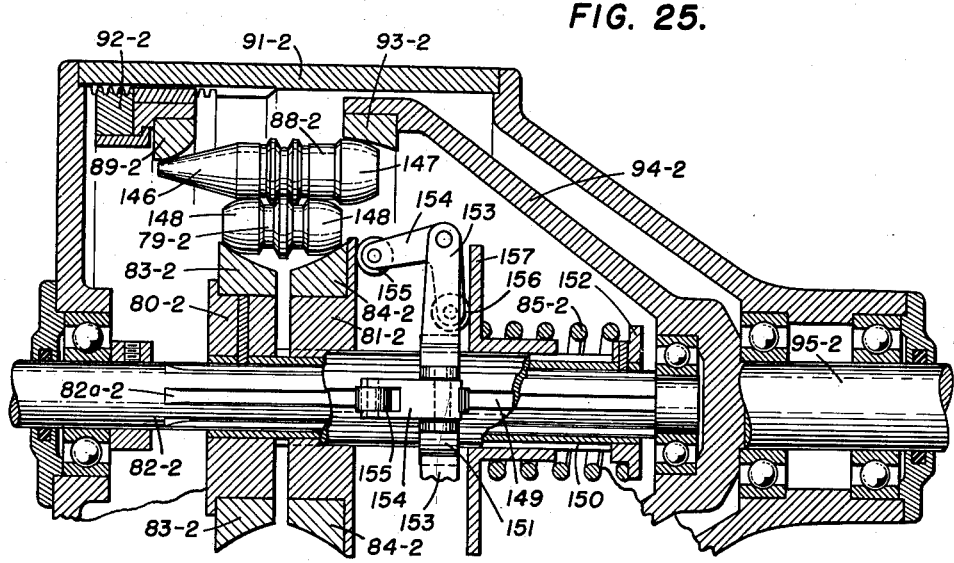

In the drawings:

Fig. 1 represents a side elevation, partially in central vertical section, of an entire transmission mechanism constructed in accordance with the invention, and disposed in direct drive position;

Fig. 2, an end elevation looking from the left in Fig. 1, with part of the housing broken away to reveal otherwise hidden parts;

Fig. 3, a vertical section taken along the line 3—3, Fig. 2, but showing the working parts in speed reduction ratio;

Fig. 4, a vertical section taken along the line 4—4, Fig. 3;

Fig. 5, is fragmentary vertical section taken along the line 5—5, Fig. 3,

Fig. 6, a fragmentary sectional view taken on the line 6—6 of Fig. 4, the rollers being shown in elevation and parts in the background being omitted;

Fig. 7, a diagrammatic view representing a kinematic analysis of certain of the contacting rollers of Fig. 4;

Fig. 8, a view corresponding to that of Fig. 6, but showing the driving rings in the direct drive position of Fig. 1;

Fig. 9, a view corresponding to that of Fig. 7, but taken with respect to the direct drive position of Fig. 8;

Fig. 10, a view corresponding to those of Figs. 6 and 8, but showing the driving rings in reverse drive position;

Fig. 11, a view corresponding to those of Figs. 7 and 9, but taken with respect to the reverse drive position of Fig. 10;

Fig. 12, a fragmentary view in vertical section corresponding to that of Fig. 3, but showing an alternative arrangement;

Fig. 13, a diagrammatic view corresponding to those of Figs. 7, 9, and 11, but taken with respect to the construction of Fig. 12;

Fig. 14, a detail view in fragmentary radial section corresponding to that of Fig. 6, but showing an alternative construction using three sets of rollers instead of two;

Fig. 15, a diagrammatic view corresponding to that of Fig. 7, but taken with respect to the construction of Fig. 14;

Fig. 16, a view corresponding to that of Fig. 3, but fragmentary and partly diagrammatic in character, illustrating a different construction indicative of the variety of forms which the invention may take in practice;

Fig. 17, a similar view of modified version of the embodiment of Fig. 16;

Fig. 18, a similar view of yet another embodiment;

Figs. 19 and 20, vector analyses of forces operative on the rollers during operation of a transmission constructed in accordance with the invention;

Fig. 21, a view in longitudinal, vertical, central section, of another construction in which is shown a simple fixed ratio version of the transmission of the invention wherein the axes of the input shaft and the output shaft are transversely spaced apart from each other instead of being in axial alignment with each other;

Fig. 22, a transverse vertical section partially offset, the view being taken on the line 22—22 of Fig. 21;

Fig. 23, a fragmentary horizontal section taken on the line 23—23 of Fig. 21;

Fig. 24, a fragmentary horizontal section taken on the line 24—24 of Fig. 21; and Fig. 25, a view corresponding to that of Fig. 16, but more fragmentary and diagrammatic in character and illustrating a modified construction.

Referring to the drawings:

The most useful embodiments of the invention are of infinitely variable type. The particular form illustrated in Figs. 1 through 11 is presently preferred for general use. It embodies features which are highly desirable in adapting the basic structural concepts of the invention to the requirements of actual practice. For example, the rollers are interlocked to insure strict maintenance of their positions longitudinally of their respective axes during operation of the transmission, thereby retaining the predetermined design relative positions of these rollers throughout the life of the mechanism. Again, compaction load on the rollers is imposed and any slack taken up by means of the combined action of a resilient member and a double splined interconnection of the driven friction member or wheel with the driven shaft, the compaction load imposed by the latter being directly proportioned to the greater torque being transmitted.

The construction illustrated comprises two independent shafts resignated 10 and 11, respectively, aligned in end to end relationship and interconnected by friction drive and floating spline components described hereinafter. Either of these shafts may be the drive shaft, depending upon convenience in any given installation.

The shafts 10 and 11 extend through opposite end sections 12 and 13, respectively, of a transmission housing, which also includes a cylindrical intermediate section 14. The several housing sections are clamped slightly together in the usual fluid-tight relationship, by means of cap screws 15.

Shaft 10 is rotatably mounted in its housing end section by means of an antifriction bearing 16 and a radial thrust bearing 17, and terminates in an enlarged bell end 10a. Shaft 11 is rotatably mounted in its housing end section by means of a radial thrust bearing 18, and has its terminus 11a rotatably mounted within bell end 10a of shaft 10 by means of antifriction bearing 19.

Oil seal 20 guards against leakage of transmission fluid and entry of foreign matter into the interior of the transmission at shaft 10, while oil seal 21 does likewise at shaft 11.

Rotation of one of the shafts 10 and 11 is transmitted to the other by a multilayer arrangement of closely packed rollers 22 and 23, preferably made of hardened steel. In the present instance, there are only two layers of rollers, but additional layers may be utilized as found expedient in various forms of the transmission, see, for example, Figs. 14 and 15.

The multiplicity of rollers 22 and 23 in such multilayer arrangement are confined within a raceway encircling the axes of the shafts 10 and 11 and defined by an inner set of mutually spaced friction rings 24 and 25 and by an outer set of mutually spaced friction rings 26 and 27. The several friction rings, like the rollers, are preferably made of hardened steel.

Ring 24 of the inner set encircles the bell end 10a of shaft 10, in abutting relationship with a shoulder 10b. It is fixed to such bell end, for rotation therewith, by a key 28. The latter is secured against axial movement by a pin 29. If shaft 10 is utilized as the drive shaft, ring 24 serves as friction drive means; otherwise, it serves as friction driven means. It remains axially fixed throughout all variations in ratio of the transmission.

Ring 27 of the outer set serves as friction reaction means, and corresponds to ring 24 in that it remains axially fixed throughout all variations in ratio of the transmission. It is snugly fitted in an annular receiving recess machined in the inner wall surface of intermediate housing section 14, and is secured against rotation by a key 30 frictionally set in elongated keyway 31.

The other ring 25 of the inner set is movable in response to variations in setting of the other ring 26 of the outer set, which is also movable and provided with manually actuated mechanism for shifting it axially of the shafts in order to vary the drive ratio of the transmission. Ring 25 encircles a sleeve 32 provided internally with helical splines 33, and is rigidly affixed thereto, in abutting relationship with shoulder 32a, for rotation therewith by reason of a key 34 held against axial displacement by a pin 35.

Shaft 11 has the major portion of its length within the transmission housing provided externally with helical splines 11b. A splined connector sleeve 36 connects the splined, friction ring carrying sleeve 32 with the splined portion of shaft 11, so that it is movable along the latter and capable of receiving or of imparting torque, depending upon which of the shafts is serving as the drive shaft.

A helical compression spring 37 is fitted about shaft 11 and between splined sleeve 32 and a collar 38, which is rotatably mounted on an annular, outwardly stepped seat 11c machined on shaft 11. Such spring 37 serves to maintain a predetermined minimum axial thrust on the aforedescribed spline connection, to maintain a minimum compacting force on the column of rollers.

Thrust from shaft 11 is transmitted to bearing 18 by stepped seat 11c, which also receives thrust from collar 38. A collar 39 abutting seat 11c covers the ends of the helical splines 11b of shaft 11.

The other ring 26 of the outer set is slidably fitted within intermediate housing section 14, for movement axially therealong. It is secured against rotation by a key 40, which fits slidably in keyway 31. Key 40 has protruding lugs 40a at its opposite ends, respectively, embracing the ring 26 and preventing axial movement of such key relative to the ring.

For the purpose of varying the position of friction ring 26 axially of the transmission, such ring is affixed to a traveler ring 41 and a ring gear 42. Traveler ring 41 is provided with an internally extending flange 41a, which completes a securement seat for ring gear 42, securement being effected by screws 43. Ring gear 42 is provided with an externally extending flange 42a, which closely overlaps an internally extending flange 26a of friction ring 26, thereby attaching the latter to both ring gear 42 and traveler ring 41 for axial movement therewith. It should be noted, however, that this arrangement permits ring gear 42 and traveler ring 41 to be rotated relative to friction ring 26.

Traveler ring 41 is externally threaded, and the inner surface of that portion of intermediate housing section 14 within which it fits is internally threaded for screw engagement therewith. Keyway 31 cuts through and traverses the internal threads 44 of housing section 14, thereby permitting friction ring 26 and its key 30 to slide backwardly and forwardly within the transmission housing.

An elongate pinion 45 is supported in meshing engagement with ring gear 42 by means of an outwardly projecting shaft portion 45a thereof, which is journaled in a closure plate 46 covering a recess 47 provided within housing end section 12. Such closure plate is fastened in place by means of screws 48, Fig. 5. The free end of shaft portion 45a is journaled in the far wall of recess 47, as indicated in Fig. 3, a boss 12a being provided for additional bearing surface.

Recess 47 is elongate transversely of the transmission, as illustrated in Fig. 2. Shaft portion 45a extends across one of its ends and has a helical gear 49 affixed thereto by means of a pin 50.

A shaft 51 extending from fixed securement to a hand wheel 52 is journaled vertically within an enlarged portion 12b of housing end section 12, and extends downwardly through recess 47, centrally thereof and between opposing bosses 12c and 12d. Affixed to shaft 51 between such bosses by means of a pin 53, and in right angular meshing relationship with helical gear 49, is a second helical gear 54.

By means of the gear mechanism described above, turning of hand wheel 52 moves friction ring 26 backwardly or forwardly, as the case may be, relative to the rollers 22 and 23, thereby widening or narrowing the annular raceway defined by the two sets of friction rings. Movable friction ring 25 is automatically shifted in position by reason of the inherent structural characteristics of the transmission, to compensate for any shift in position of movable friction ring 26 brought about by the turning of hand wheel 52.

For facilitating this action, opposite end portions of the several rollers are contoured convergently outwardly.

The rollers 22 and 23 and the several friction rings 24-27 are preferably designed to have contacts of minimum effective area, so that maximum contact pressures can be obtained. It is also desirable to interlock the contacting rollers against any possibility of axial movement relative to one another.

Minimum areas of rolling contact between the individual rollers are provided by intermediate cylindrical portions of the several rollers, and interlocking against relative axial movement is provided by interengaged, annular tongues and grooves.

In connection with the above, it should be noted that all surfaces of the individual rollers are surfaces of revolution about a common central axis.

In the construction of Figs. 1-11, each of the rollers 22 making up the outer layer of the translating, compression column of rolling elements has its opposite ends tapered outwardly in frusto-conical formation to provide respective, outwardly convergent, elongate, conical surfaces 55 for rolling contact with the outer friction rings 26 and 27, respectively. The latter have their opposing ends rounded about the inner margins thereof, as indicated at 56, to make the aforesaid rolling contacts of minimum practical area.

Between the frusto-conical surfaces 55 are disposed paired cylindrical surfaces indicated 57, respectively, separated by a downwardly convergent, trough-shaped channel or annular groove 58.

Each of the rollers 23 making up the inner layer of the translating, compression column of rolling elements has one of its ends, 59, shortened in comparison to the corresponding ends of rollers 22 and rounded to provide a longitudinally curved, annular, friction contact surface 60, and has its opposite end portion tapered outwardly in frusto-conical formation somewhat similar to that of the opposite ends of outer rollers 22, thereby providing a frusto-conical friction contact surface 61. Immediately inwardly of the outwardly convergent friction contact surfaces 60 and 61 are paired, cylindrical surfaces, indicated 62, respectively, for rolling contact with portions of the cylindrical surfaces 57 of the outer rollers 22. Between such cylindrical surfaces 62 and flanked by relief channels 63 is an annular tongue 64 having an outwardly convergent formation corresponding, in mating relation, to the inwardly convergent, trough formation of the channels or grooves 58 of the outer rollers 22 and adapted to be received thereby with minimum running clearance.

Useful friction contact between the interengaged rollers exists only within the areas of contact of cylindrical surfaces 62 with cylindrical surfaces 57. The width of these areas of friction contact is determined by design to maintain a desired contact pressure, which is advantageously the maximum which can be safely utilized in any given instance. It can be seen that the relief channels 63 afford means for widening or narrowing these contact areas to achieve any particular contact pressure desired, without necessitating changes in structural design. In other words, they make the width of such contact areas independent of their axial spacing on the roller.

Inner friction rings 24 and 25 serve, along with the structure mounting them, as the smooth-surfaced wheels heretofore referred to as being associated with the drive and driven members, respectively. In this particular embodiment, wherein the diagonally opposite roller surfaces 55 of the respective outer rollers 22 are exactly frusto-conical in formation, friction ring 24 has its outermost or rim surface of approximately frusto-conical formation determined in character by the characteristics of the several interacting friction members. The shortened and rounded ends 59 of the respective inner roller 23 ride thereon during operation of the transmission.

The inner end of ring 25 has its outer margin rounded to accommodate the frusto-conical friction contact surfaces 61 of the respective inner rollers 23, which ride thereon during operation of the transmission.

It can be seen, particularly in Fig. 4, that the multiplicity of rollers 22 and 23 form a continuously traveling, power transmitting column of multilayer, endless loop formation within the raceway defined by the friction rings 24-27, and that none of the rollers in any single layer contact one another, but each contacts a pair in the next layer. It can also be seen that the friction drive and driven means, as here represented by the friction rings 24 and 25, and that the friction reaction means, as here represented by the friction rings 26 and 27, are each disposed in contact with rollers of a layer making up such column, both of the two layers here shown being involved in these contacts, considering such contacts collectively.

The radial dimensions of this annular column of rollers can be varied without breaking frictional rolling contact, by virtue of the fact that the rollers in the individual layers can be moved closer together or farther apart. This means that the column is made thinner and longer or is made thicker and shorter. Such variation is accomplished by moving friction ring 26 axially, either toward or away from friction ring 27, in the manner explained hereinbefore.

The thickness of the column of rollers does not vary linearly with its length. The following relationship exists between the radius $R_1$ of the circle intersecting the axes of the rollers 22, see FD, Fig. 7, and the radius $R_2$ of the circle intersecting the axes of the rollers 23, see FE, Fig. 7:

$$R_2 = R_1 \cos \theta - [(r_1+r_2)^2 - (R_1 \sin \theta)^2]^{1/2}$$

Where
$r_1$=radius CD of cylindrical surface 57 of rollers 22, Fig. 7.
$r_2$=radius EC of cylindrical surface 62 of rollers 23, Fig. 7.
$\theta$=360° divided by the total number of rollers both 22 and 23.

In this particular embodiment of the invention, because of the frusto-conical shape of the surfaces 55 of the rollers 22 there is a linear relationship between the distance that these rollers 22 move axially and the distance that they shift radially when the radial dimensions of the annular column are changed. This relationship can be expressed as $$R_1 = \frac{XT}{2}$$

where T is the taper of the surfaces 55 and X is a coordinate distance measured parallel to the axis of the transmission.

Since the rollers 23 are restrained (by the aforedescribed interlocking arrangement) to shift axially with the rollers 22, the mathematical relationship between the axial and radial motion of the rollers 23 can be expressed as:

$$R_2 = \frac{XT}{2} \cos \theta - \left[(r_1+r_2)^2 - \left(\frac{XT}{2} \sin \theta\right)^2\right]^{1/2}$$

The profile of the tapered surface of the friction ring 24 is determined by the trace of the rounded ends 60 of the rollers 23, as these rollers move in the path established by the aforesaid mathematical relationship between the limits of the coordinate distance X obtained from $$X = \frac{2R_1}{T}$$

for the limiting values of $R_1$.

Since such mathematical relationship is not linear, the taper of the friction surface of the ring 24 will vary slightly from a true conical form.

As aforementioned, this transmission can be driven either from shaft 10 or from shaft 11. Assuming for a moment that shaft 10 is the drive shaft, it will transmit power to and rotate friction ring 24, which latter will then serve as friction drive means imparting movement to the inner layer of rollers 23 at the multiple points of contact with the respective rollers thereof.

The letter A in the kinematic analysis of Fig. 7 represents one of these points of contact. The letter B represents the points at which the conical surfaces 55 of the corresponding roller 22 of the outer layer of rollers contact outer friction rings 27 and 26, respectively.

For movement to take place without sliding, it is necessary that the outer rollers 22 revolve at the instant of the analysis about the point B, which is the so-called "instant center" between such outer roller 22 and the outer friction rings 27 and 26.

The letter C represents the point at which outer roller 22 contacts inner roller 23, such point falling on a line connecting the center D of such outer roller with the center E of such inner roller. To avoid sliding at the contact point C, it is necessary that the instant center between inner roller 23 and the stationary parts of the transmission fall on a straight line passing through the points B and C.

To avoid sliding at the point A, it is necessary that the instant center between inner roller 23 and the stationary parts of the transmission fall on a straight line passing through the axis of rotation F of inner friction ring 24 and the center E of inner roller 23. This locates the instant center G of relative motion between inner roller 23 and the stationary parts of the transmission, at the intersection of the two aforementioned straight lines, as indicated.

The remainder of the analysis of Fig. 7 determines the relative velocities of all parts involved, considering inner roller 23 to be revolving around instant center G.

The velocities of points of varying radii on the roller 23 are indicated by the lengths of horizontal lines connecting points at various positions on the line FE with a straight line passing through G and, as a matter of convenience, through the point $a$ at the intersection of the line DF and a horizontal line through the point A. Thus the length of the line A$a$ is arbitrarily set up to represent the velocity of the point A. The velocity of the center E of the roller 23 is represented by the length of the line E$e'$. This, of course, represents the velocity of movement of the entire roller column.

The angular velocity of the rolling column relative to that of friction ring 24 and shaft 10 is indicated by the ratio of the length of line E$e'$ to the length of line E$e$. In this instance of Figs. 6 and 7, involving speed reduction drive ratio, with shaft 10 being the drive shaft, the roller column moves at approximately one-half the angular velocity of drive shaft 10 and in the opposite direction. Friction ring 25 contacts frusto-conical surface 61 of roller 23 at the point H in Fig. 7. The velocity of this point is indicated by H$h'$, which is one-half H$h$ which represents the angular velocity of the shaft 10. This means that, for the position of parts shown in Fig. 3, shaft 11 will be forced to revolve in the same direction as shaft 10 at one-half its speed.

The purpose of the splined interconnection between shaft 11 and sleeve 32 through connector sleeve 36 is to maintain the necessary pressure at the points where rollers 22 and 23 contact each other and friction rings 24–27, to prevent slipping.

Helical spring 37 assists in this purpose, but its primary function is to maintain sufficient pressure to prevent the contacts at these points from being broken when no torque is being transmitted to the shaft 11.

In the position shown in Fig. 3, shaft 11 is being driven in a clockwise direction as viewed from the left, and its splines 11b are forcing connector sleeve 36 to the left along the splined portion of shaft 11 with a force which is transmitted to sleeve 32 through end shoulder 36a of such connector sleeve and from sleeve 32 to friction ring 25 through shoulder 32a.

If the direction in which shaft 11 is being driven were to be reversed, the splines 11b would force connector sleeve 36 to the right until it butted against collar 39, as shown in Fig. 1. However, in such case, the exterior splines on connector sleeve 36 (which are opposite hand to the splines 11b) would force sleeve 32 to the left, applying force to friction ring 25 through shoulder 32a as before. The lead of splines 11b and such exterior splines of connector sleeve 36 are the same, so that the force applied is independent of the direction of rotation. This lead is calculated to be such that the force applied through the splines to friction ring 25 (a function of the torque transmitted to shaft 11) is just great enough to cause sufficient pressure at various contact points on the column of rollers 22 and 23 to transmit such torque without slippage.

There are two advantages to this arrangement. Since friction losses will vary with applied forces, maximum efficiency is obtained by varying these pressures in a manner insuring their never greatly exceeding the values necessary to transmit useful torque. Since wear on the various parts is also a function of the acting forces, an arrangement which keeps these forces at a minimum extends the working life of the mechanism.

The drive ratio of the transmission is adjusted by turning hand wheel 52, which, through shaft 51 and helical gears 49 and 54, turns pinion shaft 45a and pinion 45. Such pinion turns ring gear 42, which causes traveler ring 41 to turn with respect to intermediate housing section 14. By reason of the threaded interengagement of the latter two, they are not only held in perfect axial alignment, but traveler ring 41 is moved axially with respect to the housing when rotated in the manner described, thereby moving friction ring 26 correspondingly to vary the spacing between it and friction ring 27.

One of the features of the invention is the ease and convenience with which a direct drive lockout can be established. As shown in Fig. 1, when traveler ring 41 is moved to the extreme left into abutting relationship with housing end section 12, the construction is preferably such that the mutually adjacent ends of sleeve 32 and of bell end 10a of shaft 10 interengage. For this purpose, such end of sleeve 32 is tapered, as at 66, and such end of bell end 10a is matingly tapered, as at 67, in a manner such that the force applied by the splines 11b and the splines of connection sleeve 36 is sufficient to transmit the torque between shafts 10 and 11 without slipping, thereby establishing a direct drive lockout.

Under these circumstances the rollers are very lightly loaded, inasmuch as the force applied by the splines (ordinarily absorbed by the rollers) is now taken up by the interengaged tapered ends.

The analysis of Fig. 9, as applied to the extreme position of Figs. 1 and 8, shows that the roller column will be transmitting power between shafts 10 and 11 at a 1 to 1 ratio at the time the contact between tapered surfaces 66 and 67 is made. All points in Fig. 9 are designated identically with equivalent points in Fig. 7. In Fig. 9, points A and H coincide; thus, points a, h, and h' also coincide, meaning that shaft 11 will be rotating at the same angular velocity as shaft 10. The relative lengths of lines Ee' and Ee indicate that, under these conditions, the roller column will be moving in a direction opposite to the rotation of the shafts 10 and 11 and at approximately ⅓ the angular velocity thereof.

It is, of course, not necessary that this direct drive lockout be provided. Yet, the possibility of obtaining same so simply in those instances where it would be useful is a distinct advantage afforded by the invention.

If the hand wheel 52 is turned until friction ring 26 is in its extreme right position, as established by shoulder 14a of intermediate housing section 14, the several friction rings and rollers will assume the positions shown in Fig. 10. In the corresponding analysis of Fig. 11, pertinent points are designated identically with equivalent points in Figs. 7 and 9. It will be noted from comparing Figs. 7, 9, and 11 that the instant center G shifts away from the center E of the roller 23 as reduction ratio is increased by moving friction ring 26 toward friction ring 27. It is this action that causes the relative rotational velocity of the roller column and shaft 10 to vary. In Fig. 11 the relative lengths of lines Ee' and Ee show the roller column to be moving in the opposite direction and at over ⅘ the velocity of shaft 10. It will be apparent that there is an advantage to this action, inasmuch as the velocity of the rollers is low when they are not required to produce a large variation of speed but increases when higher velocity will serve a useful purpose.

Since the point H, where roller 23 contacts friction ring 25 in the position of Fig. 10, is closer than the instant center G to the center E of such roller 23, the transmission will be driving in reverse. The ratio between lines Hh' and Hh shows the reverse ratio to be approximately 7½ to 1.

As friction ring 26 is gradually moved from the position shown in Fig. 8 to that shown in Fig. 10, the transmission ratio will change with infinite variation between direct drive and reverse, including the point where the instant center G coincides with the point H and the transmission reduction ratio is infinite. The range and all the relative velocities involved are determined by design.

It is not essential that the rolling elements be of the shape illustrated in Figs. 1 through 11. Many other shapes and structural combinations are possible. The embodiment illustrated in Fig. 12 and analyzed in Fig. 13 is an example. Parts in Figs. 12 and 13 that are similar to parts in the foregoing figures are correspondingly identified, a dash and the numeral 1 being added for differentiation.

The roller 23–1 differs from the roller 23 in having its surface 61–1 concave, rather than truly frusto-conical, and in having a rounded friction contact surface 60–1 considerably less in diameter than the paired cylindrical surfaces 62–1 to provide an overdrive or speed increasing ratio for the transmission. It will be recalled that the friction contact end 60 of each roller 23 is rounded in such manner that friction ring 24 contacts the rollers 23 at a diameter only slightly less than that of cylindrical surfaces 62. This precludes any overdrive ratio.

Rollers 22–1 differ considerably from rollers 22. The latter's conical friction contact surfaces 55 are replaced by tapered spacer portions 71 terminating in respective knobs that approximate sections of spheres in configuration and present respective rounded friction contact surfaces 55–1.

Friction ring 27–1 also differs considerably from friction ring 27 in being tapered, as illustrated, rather than rounded at its inner end. Friction ring 26–1 is similarly configurated. The configuration of friction ring 24–1 is determined by that of friction ring 27–1, being in this instance concave.

In this embodiment, splined connector sleeve 36 is eliminated, and the splines 11b–1 are straight. The tapered surfaces 66 and 67, which, in the first embodiment, cooperate to provide a direct drive lockout, are here eliminated, enabling the overall length of the transmission to be considerably reduced.

As above indicated, this embodiment of Fig. 12 presents several modifications in design, any one or more of which could be used in connection with the first embodiment. Nevertheless, there are advantages to the particular combination of Fig. 12. Thus, it can be seen that the active rolling diameter of roller 23–1 at its contact with friction ring 24–1 is less than at its contact with friction ring 25–1. The effect of this condition is clear from the kinematic analysis of Fig. 13.

Considering Fig 13, since Hh' is 1½ times Hh for the conditions illustrated in Fig. 12, shaft 11–1 will be forced to revolve in the same direction as shaft 10–1 at 1½ times the speed of the latter. Such an overdrive ratio is impossible to obtain with the first embodiment, which possesses a direct drive lockout. However, it is apparent that the particular configurations of the rolling surfaces in the embodiment of Fig. 12 are not necessary to provide an overdrive. Overdrive depends merely on the ratio of rolling diameters of the rollers 23–1 at one position of the drive, and not on the shape of the surfaces.

Rollers shaped as indicated in Fig. 12 have both advantages and disadvantages over the rollers of the first embodiment. Replacing the conical surface 61 with a curved surface, such as 61–1, which could be either concave, as shown, or convex to suit design requirements, has two advantages. It makes possible the provision of a range of high efficiency where the surface is relatively flat, while still allowing wide range at lower efficiencies where such surface is steeper. It also distributes wear on the rounded edge of the cooperating friction ring 25-1.

It has a disadvantage, however, in that the pressure at the points of rolling contact is not a linear function of the axial thrust applied to the ring 25-1. This would make it extremely difficult to obtain the advantages normally derived from the loading through helical splines 11a and those exterior to connector sleeve 36. Yet, for many applications, helical spline loading will not be justified, and the type of loading illustrated in Fig. 12 will be appropriate. With the latter type of loading, the required axial thrust on friction ring 25-1 is provided entirely by compression spring 37-1.

Given curved friction contact surface 61-1 on roller 23-1 and rounded friction contact surfaces 55-1 on rollers 22-1 as in that embodiment of Fig. 12, it is not necessary that the other tapered friction surfaces be correspondingly curved. It is simply a matter of choice that the friction rings 27-1 and 26-1 have convexly curved surfaces as shown. They might just as well be configurated in some other fashion, as may be found convenient. Furthermore, as indicated, it is not even essential that the taper or curvature of the friction surface of ring 26-1 be exactly the same as that of ring 27-1, or that the two ends of roller 22-1 be exactly symmetrical. Differences in these surfaces cannot affect the ratio characteristics of the transmission. The only purpose of varying the tapers or curvatures is to vary the contact pressures or to help balance the forces acting on the rollers, if and when that becomes desirable.

In those embodiments so far described, where the axes of the rollers are parallel to each other and to the axis of the transmission, it is essential that the radius from the axis of the transmission to the points of contact between the rollers of the outer set (22 or 22-1) and the reaction friction ring (27 or 27-1) be the same as that to the point of contact with the adjustable friction ring (26 or 26-1). This, of course, places a definite limitation on the combinations of contours which can be successfully used for the particular friction contact surfaces concerned.

The effect of rollers having rounded friction contact surfaces similar to surface 55-1, as compared to rollers having conical friction contact surfaces similar to surfaces 55, is that the diameters of the respective areas of rolling interengagement of such rollers with friction rings 27-1 and 26-1 is much more nearly constant. It is entirely a design consideration as to which type of roller is used. For the rollers 22-1, the instant center G in Fig. 13 would not shift greatly with varying ratio, and their angular velocity relative to shaft 10-1 would be more nearly constant. As shown in Fig. 13, the ratio of lines E$e'$ and E$e$ indicates that rollers 22-1, in this instance, would have 0.7 the angular velocity of shaft 10-1.

It is possible to use more than a double column of rollers in a transmission conforming to the invention. Figs. 14 and 15 illustrate an arrangement using a triple column of rollers. In this embodiment, parts that correspond to parts in Figs. 1-11 are given the same number, with a dash and the numeral 2 added.

Any combination of conically, roundly, or curvedly tapered friction surfaces that would serve in the preceding embodiments of the transmission can be used on the friction rings and rollers in this embodiment.

For the purpose of illustration, the inner rollers 23-2 have the friction rolling surfaces of their respective opposite ends contoured similarly to those of the rollers 23. The center section of each of such rollers presents a cylindrical surface 70 of lesser diameter than the adjacent portions of end surfaces 60-2 and 61-2 and joined thereto by a set of steeply tapered surfaces 71.

The intermediate rollers 72 are spools having respective sets of tapered end surfaces 73 designed to roll against the sets of tapered surfaces 71. Narrow cylindrical surfaces 74 immediately adjacent such tapers 73 roll on corresponding surfaces 75 of the outer rollers 22-2 and upon cylindrical surfaces 70 of the respective inner rollers 23-2, while inwardly facing sets of tapered end surfaces 76 defining respective annular grooves 58-2 roll on corresponding sets of surfaces 77 of annular tongues 64-2 projecting from the respective outer rollers 22-2.

Such outer rollers 22-2 have opposite conical ends 78 terminating in respective, rounded, friction surfaces 79 that roll upon tapered surfaces of friction rings 26-2 and 27-2.

In the corresponding kinematic analysis of Fig. 15, point B represents the friction contacts of outer roller 22-2 with friction rings 26-2 and 27-2. Point C', lying on the straight line connecting the center D of such outer roller with the center I of intermediate roller 72, represents the friction contacts of cylindrical surfaces 75 of the outer roller with cylindrical surfaces 74 of the intermediate roller.

Since intermediate roller 72 is constrained to be translated in a circle about the central axis of the friction rings, the instant center of such intermediate roller with respect to the stationary members of the transmission must lie on a radial line from this central axis through the center I. Such instant center must also lie on a straight line through points B and C'. The intersection of these two straight lines locates the instant center at the point J. Point C" represents the friction contacts of the set of cylindrical surfaces 74 of intermediate roller 72 with the cylindrical surface 70 of inner roller 23-2. By construction similar to that for outer and inner rollers 22 and 23, respectively, in Fig. 7, the instant center of inner roller 23-1 with respect to the stationary parts of the transmission is located at G.

Since the instant center G is on the opposite side of the center E from the point A in Fig. 15, the rollers travel in the same direction as friction ring 24-2 rotates. The line E$e'$ is only about ⅛ as long as line E$e$, which means that the rollers in Fig. 15 will be translated around the central axis of the transmission at only ⅛ the angular velocity of such ring 24-2.

The line H$h'$ is a little less than half the length of the line H$h$. The reduction ratio between rings 24-2 and 25-2 will, therefore, be a little more than 2 to 1. This is almost the maximum reduction for the rollers shown.

These figures are typical of transmissions using three layers or columns of rollers. The translating velocity of the rollers is very low as compared to the angular velocity of the drive. This makes it particularly useful for high speed drives. However, these transmissions cannot provide a reverse or a wide range of ratios.

Not only are there many possible combinations of friction surface contours that can be used on the rollers and friction rings of the transmission of the invention to give various functional characteristics, but there are also many ways in which the power can be applied to and taken from the column of rollers.

One of the possible arrangements is illustrated somewhat schematically in Fig. 16, where only the main functional parts of the transmission are shown, the operating mechanism for changing ratio, among other things, being omitted. In this arrangement, power is applied to the inner rollers, here designated 79, by two driving wheels 80 and 81 mounted on power input shaft 82 for rotation therewith. The wheel 80 is fast on such shaft 82, and contacts rollers 79 by means of a friction ring 83. The wheel 81 is driven through splines 82a, and is free to move axially along the shaft. It is held with its friction ring 84 in contact with rollers 79 by the combined action of a spring 85 and a sleeve 86 (helically splined externally at 86a), which impart thrust to wheel 81 through a thrust bearing 87. The outer rollers 88 contact a reaction friction ring 89 secured in an axially movable ring 90, the latter being secured against rotation in transmission housing 91 and being shiftable axially therein by an externally threaded ring 92. These rollers 88 also contact a friction ring 93 secured to a wheel 94.

Wheel 94 encircles output shaft 95, sleeve 86 being positioned between such shaft 95 and a hub 94a (internally splined at 94b to engage the splines 86a) on wheel 94. Sleeve 86 is axially movable on shaft 95, but is secured against rotation therewith by means of straight splines 95a.

Wheel 94 drives output shaft 95 through the action of sleeve 86. Torque is transmitted from hub 94a to such sleeve through the intermeshed helical splines 86a and 94b. Because of the helical nature of such splines, transmission of torque from wheel 94 to shaft 95 is accompanied by an end thrust on sleeve 86 that is proportional to the torque being transmitted. It is this end thrust, in combination with the action of spring 85, that holds friction ring 84 of wheel 81 against rollers 79.

For convenience of illustration and description, the rollers 79 and 88 are shown here in an arbitrarily distorted position similar to that of Figs. 6 and 14. This has necessitated some distortion of all working parts farther removed from the axis of the transmission.

The particular contouring of these rollers 79 and 88 further exemplify what may be done to achieve specific objectives. The knob-like terminus 88a of roller 88 is an expedient that may be resorted to in any instance where it is desirable to make the annular contact surface of any friction ring plane (89a) rather than curved. The arrangement of annular tongue, groove, and relief channels differs from what has heretofore been shown, for the purpose of minimizing sliding at the contacts between the tongue and the walls of groove.

Such arrangement involves the provisions of an annular tongue 79a on each roller 79 that is less in diameter relative to the cylindrical surfaces 79b than in previous embodiments, and flanking relief channels 79c that are deeper. Each roller 88 is provided with raised collars 88b flanking the annular groove 88c, and with relief channels 88d between such collars 88b and the cylindrical surfaces 88e.

The purpose of raised collars 88b is to increase the outer diameter of annular groove 88c over that of the cylindrical surfaces 88e, so that the mean diameter of the contact of the lateral walls of tongue 79a with the lateral walls of groove 88c is approximately equal to the diameter of the contacts between cylindrical surfaces 79b and 88e.

The purpose of relief channels 88d is to permit grinding of the cylindrical surfaces 88e.

Appropriate kinematic analysis of this embodiment of the invention will show that the drive ratios can extend from overdrive to a very low reduction and even into reverse. However, the proportions necessary for obtaining reverse are somewhat impractical.

The relative velocity of the rolling column becomes lowest in the low reduction ratios. For this reason, transmissions of this type are most efficient in reduction ratios, and are best adapted to drives having greater variation of drive speed than of output speed. The type of transmission represented by the embodiment of Figs. 1–11 is, on the other hand, most efficient in direct drive and overdrive, although the particular construction shown is not equipped for overdrive. Elimination of direct drive lockout surfaces 66 and 67 in such construction makes overdrive possible, see Fig. 12.

To prevent slipping at points of friction contact on the rollers of all embodiments of the transmission, the forces bearing radially at such points must exceed the product of the tangential forces and the coefficient of friction between the surfaces involved. Since the maximum tangential force is dependent upon the greater of the torques being transmitted by the two shafts and since the radial forces vary with the compacting force on the rollers, it follows that such compacting force on the rollers will be most effective if it is a function of either the input or the output torque, whichever is the greater.

For this reason, where the compacting force on the rollers is provided through the action of helical splines, such helical splines are located on the shaft which will normally turn at the slower speed and, therefore, transmit the greater torque.

Where spring loading provides the compacting force on the rollers, it would be best in most applications to have the spring loading increase as the difference in rotational speed of the two shafts increases. This is true because the probability of encountering high torque loading on one of the shafts is greater when that shaft is turning slowly as compared to the speed of the other shaft.

Both the spring 37 and the splines 11b of the embodiment of Fig. 3 meet these requirements.

In the embodiment of Fig. 16, the helical splines 94b transmit torque to the shaft 95, which is normally the lower speed shaft; but the action of spring 85 is just opposite to what is noted above as ordinarily being desirable. The compacting force applied by this spring is greater when the transmission ratio is such that the shafts 82 and 95 turn at the same speed than when the shaft 95 turns more slowly.

This arrangement is not unjustified, however, for the transmission of Fig. 16 is capable of ratios in which shaft 95 turns faster than shaft 82, as well as ratios in which the shaft 95 turns slower. In the speed increasing range the location of the splines 94b becomes improper, and more compacting force than the splines would supply might well be necessary to keep the rollers from slipping. Under such circumstances, the additional force required will be supplied by the spring, which will be exerting its greatest force. In other words, the action of the spring is correct for speed increasing ratios, while the action of the splines is correct for speed reducing ratios.

In comparing the arrangement of Fig. 16 with that of Figs. 3–11, it will be observed that, in the latter, power is applied to the rollers through the single small diameter friction ring 24, and is taken off from the rollers through the single small diameter friction ring 25. The reaction torque necessary to balance the difference in torques on such input and output friction rings is supplied by two large diameter friction rings 26 and 27.

It can readily be seen that the reaction torque capacity of such latter embodiment is much greater than either the input or output torque capacity. Not only are there two reaction friction rings 26 and 27 and only one input friction ring 24 and one output friction ring 25, but the reaction rings 26 and 27 are each capable of applying much greater torque than can be applied through either ring 24 or 25 because the rings 26 and 27 contact the rollers 22 at a greater radius from the axis of the transmission than the radius at which the rings 24 or 25 contact the rollers 23. Thus, a given tangential force at the point of roller contact will impart a greater torque when applied through ring 26 or 27 than when applied through ring 24 or 25.

The greater torque capacity of rings 26 and 27 is also due in part to the fact that, in a plane transverse to the axis of the transmission, the inner surfaces of the rings 26 and 27 curve in the same direction as the surfaces of the rollers 22 which contact them, while the outer surfaces of the inner rings 24 and 25 curve in a direction opposite to the curvature of the surfaces of the rollers 23 which contact them. As a result, the contacts between rings 26 and 27 and rollers 22 extend farther around the circumference of the rollers and thus have greater area and bearing capacity than contacts between rollers 23 and rings 24 or 25.

Special design considerations are required to take full advantage of this greater bearing capacity of the outside friction rings. However, it will be noted that centrifugal force on the rollers helps to provide greater radial loading on the outer friction rings.

In the embodiment of Fig. 16 power is applied to the rollers 79 by two, small diameter, power input friction rings 83 and 84, and it is obvious that this will provide double the input torque capacity of the embodiment of Figs. 1 to 11, where only one such friction ring 24 is used.

It is also quite probable that the embodiment of Fig. 16, in which power is taken off from the column of rollers by a large diameter, outside friction ring 93, will be proportioned in practice to have twice the output torque capacity of the embodiment of Figs. 1 to 11 in which such power is taken off by the small diameter, in side friction ring 25.

There is no excess of reaction torque capacity in the embodiment of Fig. 16. Such reaction torque capacity is approximately equal to the output torque capacity, since the reaction torque is supplied by a single, large diameter, friction ring 89 similar to the output friction ring 93.

Embodiment of Fig. 17

In certain instances, given proper design proportions, it is possible for the two small diameter wheels (80 and 81) to impart greater torque to the roller column than can be transmitted by a single large diameter wheel 94. In such cases, the high speed, low-torque, input shaft 82 may be made the low speed, high-torque, output shaft 95.

This is accomplished in the embodiment of Fig. 17, where a somewhat different combination of roller and friction contact surfaces are shown. Parts corresponding to those in Fig. 16 are given the same number with a dash and the numeral 1 added.

The essential difference between the construction of Fig. 17 and that of Fig. 16, besides the change in shapes of rollers and friction contact surfaces, is that there is a rearrangement of input and output shafts and spline connections. A different sleeve 96 is utilized, so that shaft 82–1 can serve as the output shaft.

Such sleeve 96 slides axially on splines 82a–1, and has opposed helical or herringbone splines 96a on its outer surface that engage corresponding splines 97 internally of wheels 80–1 and 81–1. By virtue of these herringbone splines, thrusts are developed which tend to draw the wheels together when torque is transmitted between such wheels and the shaft 82–1.

Inasmuch as friction ring 83–1 on wheel 80–1 and friction ring 84–1 on wheel 81–1 both contact roller 79–1 at the same radius, one of such wheels cannot rotate with respect to the other without the occurrence of slipping at the points of contact between such friction rings and roller 79–1. To avoid this slipping, any rotation and accompanying axial shift of wheel 81–1 on herringbone splines 96a of sleeve 96 must be counteracted by an equal rotation and opposite axial shift of wheel 80–1.

Wheel 80–1 is restrained from axial movement on shaft 82–1 by a collar 98 secured to said shaft. Any axial shift of wheel 80–1 on sleeve 96 is compensated for by an opposite axial shift of sleeve 96 on splines 82a–1 of shaft 82–1. Thus actual axial movement is confined to wheel 81–1.

The transmission of Fig. 17 can be designed to give a complete range of ratio variation from overdrive to reverse. It has two principal distinguishing characteristics in addition to having two driven wheels on the output shaft.

One of such characteristics resides in the fact that, since contact points with reaction ring 89–1 and with friction ring 93–1 of input wheel 94–1 both occur at fixed radii on rollers 88–1, the rate at which the rollers are translated around the axis of the transmission is fixed with respect to the speed of rotation of the input shaft 95–1. For the design proportions illustrated in Fig. 17, the angular velocity of the roller column would about equal the angular velocity of the input shaft. This transmission would therefore operate best at low speeds.

The other characteristic resides in the fact that, unlike the rollers of any previously described embodiment, it is not necessary for a contact point on one end of either roller 79–1 or 88–1 to make a greater axial shift on the surface of such roller than is made by the corresponding contact point on the opposite end of such roller when the transmission ratio is changed. Under such condition it is possible to proportion the rollers so that axial loading thereof is balanced for all transmission ratios, without any axial forces acting at the points of contact between rollers. It is therefore possible to eliminate the interengaging tongues and grooves of rollers 79 and 88, Fig. 16, and provide each roller 88–1 with only narrow cylindrical surfaces 88e–1 contacting intermediate cylindrical surface 79b–1 of roller 79–1.

Embodiment of Fig. 18

Another arrangement having significant advantages is shown in Fig. 18. This is a balanced drive in which the rollers are subjected only to turning moments about their individual axes and not to any forces tending to move them out of the axial alignment. In the lower half of Fig. 18, as indicated by the break, the rollers and other parts are shown in distorted positions much as in the case of Figs. 16 and 17, but the upper half of the view is true to fact.

In this embodiment of the invention, two power input wheels 100 and 101 contact an inner column of rollers 103, the wheel 100 being axially movable on drive shaft 104 and subjected to end thrust by any suitable means, such as spring 105.

Reaction rings 106 and 107 contact an intermediate column of rollers 108, and are fixed against rotation. The axial position of reaction ring 106 can be varied by means of an internally threaded and externally toothed actuating ring 109 of composite formation, as illustrated, adapted to be rotated by pinion 102.

Friction rings 110 and 111 contact an outer column of rollers 112. Friction ring 110 is fixed in axial position by being secured to a cylindrical flange member 115a of wheel 115. Friction ring 111 is secured to sleeve 113, which is connected by splines 115b to member 115a so as to rotate therewith and yet be free to shift axially. Friction ring 111 is held against roller 112 by any suitable thrust means, such as a finger spring 114.

Output wheel 115 is journalled on a stationary shaft 116 that ties reaction ring 107 rigidly to transmission housing 117, as by means of key 118. Attached to wheel 115 is a gear 119 which meshes with another gear 120 rigidly mounted on driven shaft 121.

The output wheel 115 of this embodiment of the invention cannot be made to rotate nearly as fast as drive shaft 104. However, the drive ratio extends into reverse, and so, through the output gearing, which is an essential part of the arrangement, the range of input speed to output speed can be made any desired value.

Loading considerations on rollers

There are many factors that affect the forces acting on the rollers during operation of any roller transmission of this invention, and there is much that can be done in design to make these forces such that best performance and maximum efficiency will be attained. This is largely a matter of common engineering design to make the forces at various contact points proportional to the inherent ability of each contact to withstand repetitive loading. Every transmission and every shape of roller will be a special problem. However, there are certain conditions that must be met in any design.

Figs. 19 and 20 show some of the conditions that exist on a typical transmission roller 125. Such roller is contacting a driving wheel, merely indicated by line 126, at a point A and a driven wheel, merely indicated by the line 127, at the point C. There are two contact points between this roller and another roller 128, at D, and there are two contact points between it and another roller 129, at E. There are also contacts between the annular tongue 125a and mating grooves on the other rollers 128 and 129.

The force $Ra$ acting at the point A can be resolved into three components, $Ra1$, $Ra2$, and $Ra3$. The force $Rc$ acting at the point C can also be resolved into three components, $Rc1$, $Rc2$ and $Rc3$. Except in special cases, such as in the transmission of Fig. 17, or unless special arrangements are made to allow compensating contouring of some of the friction surfaces, a vector analysis of the forces acting parallel to the plane containing the roller axis and the contact points A and C, including the forces applied at the points D and E, will show that, for most drive ratios, the forces $Ra1$ and $Ra2$ will not equal the forces $Rc1$ and $Rc2$, respectively, and that for this condition to hold there will be an end thrust $Rx$ acting between the rollers and applied on annular tongue 125a. The magnitude of $Rx$ will vary as the contact point C is moved axially on the roller in accordance with change in transmission ratio. Normally, if the outer rollers of the transmission are symmetrical about their axial center, the force $Rx$ will be zero when the axial position of point C balances that of point A. Under these conditions it should be noted that point C will be the same distance from the centrally located annular tongue 125a, as is point A.

The condition which must be met to insure stability can be illustrated by determining the resultant forces which act at the contact points between the rollers. For example, if the forces applied at the points A and C in Fig. 19 are resolved into resultant forces on cylindrical surfaces G and H, the force acting at the surface G will act as though applied through the point B. This force will lie in a plane perpendicular to the roller axis and can be represented by $Rb$ as made up of the components $Rb3$ and $Rb1$.

In order for the drive to be stable under these loading conditions it is necessary that the force $Rb$ lie between the contact points D and E. This applies at both surfaces G and H.

These conditions can be met for any transmission by varying the design proportions of the rollers.

Embodiment of Figs. 22–24

Another possible construction of the transmission of this invention is illustrated in Figs. 21–24. This embodiment differs from the others principally in the fact that the input and output shafts are spaced apart transversely of their lengths, rather than being axially aligned as in all of the foregoing constructions. For convenience of illustration, this construction is of fixed ratio.

In the form illustrated the transmission housing, as made up of an intermediate section 130 and opposite end sections 131, respectively, defines, along with an internal spacer 132, an endless loop channel 133 for confining two layers of rollers 134 and 135 relative to a pair of wheels 136 and 137.

The wheel 136 is rigidly mounted on input shaft 138 and is advantageously encircled and spaced apart from the rollers 134 by an annular series of rollers 139. The rollers 139 are held in properly spaced position around the wheel 136 by means of spacer rings 140, in which cylindrical axial extensions 141 of such rollers are journalled.

If, in a transmission with the wheel and roller proportions shown in Fig. 21, the input wheel 136 is rotated in a clockwise direction, as indicated by the arrow, the column of rollers 134 and 135 will move in a clockwise direction around both wheels 136 and 137 at approximately ⅖ the angular velocity of the wheel 136. Such rollers 134 and 135 will force the wheel 137 (which is rigidly mounted on output shaft 142) to rotate in a counterclockwise direction at approximately ⅖ the angular velocity of the wheel 136.

Two curved plate springs 143 and 144 are located in receiving recesses provided in the straight intermediate portions of the housing section 130 to take up slack in the column of rollers 134 and 135 and to impart the minimum compacting force necessary to prevent the rollers from slipping on the surface of the wheels. On the power transmitting side of the roller column, the rollers 135, which bear quite heavily on the walls of the channel 133, force the spring 143 to lie flat in its containing recess while such rollers pass thereover bearing directly on the inside wall of housing section 130.

On the slack side of the roller column, the force exerted by spring 144 is sufficient to flex it outwardly from its retaining recess, as shown, thus diminishing the transverse spacing and correspondingly increasing the spacing of the rollers 134 and 135 longitudinally of the roller column. In this way the roller column is properly compacted under minimum compacting force.

Such minimum compacting force need not be large to preclude any possibility of slipping at the points of driving contact, for the compacting force increases cumulatively for each roller around the driving wheel 136 and decreases in similar fashion around the driven wheel 137.

One way in which this embodiment of the invention differs from those described previously resides in the fact that, here, more than one row of rollers in the column bear heavily upon stationary surfaces. This condition introduces a criterion which must be strictly adhered to in the design of the transmission. The proportions of the rollers and the configuration of the confining walls of the endless loop channel 133 must be such that, where rollers bear heavily upon stationary surfaces, the bearing contacts occur at the instant centers about which such rollers turn.

This does not hold true for the slack side of the column above the spring 144. There, the forces between the rollers are light, and a simple vector analysis will show that the force with which the rollers bear against the stationary walls are still lighter. Some slipping of the rollers on the housing walls can therefore be tolerated in this region.

At the top intermediate portion of Fig. 21, where the column of rollers moves from left to right rectilinearly, the instant centers of the motion of both the rollers 134 of the inner layer and the rollers 135 of the outer layer lie on the outer extremities of the roller column. For this reason, the rollers can progress without sliding when confined between parallel stationary surfaces, such as the walls of housing section 130 and spacer 132.

However, as a roller 135x, Fig. 21, in the outer layer of the column begins to take a curved path around the wheel 137, the instant center of the following inner roller 134y will shift away from the inner extremity of the column. This is clearly indicated by kinematic analysis. With the outer housing section 130 stationary, the instant centers of the motion of rollers 135x and 135z must lie at the points A and B, respectively, Fig. 21, while the instant center of the motion of the roller 134y must lie at the point I, which is the intersection of a straight line drawn through the points A and C (C being the contact point between rollers 135x and 134y) and another straight line drawn through the points B and D (D being the contact point between rollers 135z and 134y).

The instant center of the motion of the inner roller 134y will shift away from the inner extremity of the time that the leading roller 135x starts moving in a circular path until the following roller 135z starts around such circular path. During this period of transition from straight to circular motion, the inner rollers 134 are supported by inserts 145 in the transmission housing, see Figs. 21, 22, and 24.

Such inserts 145 support the rollers 134 by contact with their tapered ends 134a. The surfaces of the inserts are so contoured that these contacts follow the lines JIK, Figs. 21 and 24, which are the paths of the instant center I of the motion of rollers 134. Only after this transition is completed do the rollers 134 bear on the wheel 137 or on the rollers 139.

To avoid premature contact between such rollers and wheels, the channel 133 is narrower between housing section 130 and spacer 132, where it is straight, than in the curved sections around the wheels 136 and 137. During the transition period, the centers of rollers 134 follow the path indicated by the line LM, Fig. 21, which approaches the surface of the wheel 137 with gradually increasing curvature.

After the transition to the circular path is completed, the instant center of motion of rollers 134 moves around wheels 136 and 137 at the radius of the point K. One such instant center is indicated by the point K' on roller 134v, Fig. 21. The instant center of the motion of the contacting roller 139w is located at the point N, which is the intersection of a straight line drawn through the point K' and point E (E being the contact point between rollers 134v and 139w), and a radial line drawn through the center of wheel 136 and the center of roller 139w.

To follow the criterion above set forth for design of this transmission, the rollers 139 can contact a stationary surface only at their instant centers N. Therefore, each of these rollers 139 has narrow cylindrical surfaces 139b of such radius as to intersect the points N, respectively, Fig. 21, located at either side of its intermediate cylindrical portion 139a.

The stationary surface of the spacer 132 contacts the rollers 139, on the trace of their instant centers, by contacting the cylindrical surfaces 139b. The intermediate cylindrical portion 139a moves freely in the recess 132a.

It should be noted that the rollers 135 in this embodiment are relatively short as compared with the rollers 134, and roll within endless loop guide channel 130a defined along the inner surface of intermediate housing section 130. This construction provides proper bearing pressure, while minimizing extraneous friction.

It should be noted that in all of the foregoing embodiments of this invention, contact between any two rolling elements takes place at at least two points aligned substantially in parallel with the axes of the input and output shafts, or corresponding rotatable elements, and lying on the rolling surfaces of such rolling elements at substantially equal radial distances from the respective axes of symmetry of such rolling elements. This means that all rolling elements which contact a friction surface other than another rolling element intersect a common plane normal to the axes of the respective power input and output shafts or corresponding rotatable elements. Thus, the several radially disposed layers of rolling elements are arranged in radial progression outwardly of the axes of such shafts, each successive layer overlapping the preceding layer in the progression and no layer being completely spaced apart from another layer along such axes.

When the rolling elements are elongate rollers, as they are in the several specific embodiments shown, the two points of contact mentioned above will be mutually spaced apart, either along a continuous line of contact (Figs. 22 and 23) or at respectively opposite sides of clearance between the two rolling elements.

Embodiment of Fig. 25

The embodiment illustrated schematically in Fig. 25 is a modification of the embodiment of Fig. 16, wherein the shapes of the rollers and the friction rings are changed and a different method of applying axial thrust to the driving wheels is employed. Parts in Fig. 25 corresponding to parts in Fig. 16 are given the same number, with a dash and the numeral 2 added.

Each of the outer rollers 88-2 has one end tapered to provide a convergent frusto-conical surface 146 and has its other end tapered to provide a longitudinally convexly curved, convergent surface 147. The reaction friction ring 89-2 contacts the surface 146, presenting a contacting surface which is convexly curved longitudinally of the axis of the ring and rollers. The outer friction ring 93-2 contacts the surface 147, presenting a contacting surface which is concavely curved longitudinally of the axis of such ring and rollers.

Each of the inner rollers 79-2 has its opposite ends tapered to provide convergent, longitudinally convexly curved surfaces 148. The inner friction rings 83-2 and 84-2 contact the respectively opposite end surfaces 148 of rollers 79-2, both of these presenting contacting surfaces which are concavely curved longitudinally of such rings and rollers.

The wheel 94-2, which mounts the friction ring 93-2, is secured to the output shaft 95-2. The wheel 80-2 is securely attached to a sleeve 149, which engages the splines 82a-2 and is free to slide axially on the input shaft 82-2. The sleeve 149 has straight splines 150 on its outer surface, which engage mating splines in the hub of the wheel 81-2. There are also two collars 151 and 152 secured to the sleeve 149. Pairs of arms 153 extend radially from the collar 151. At least two pairs of the arms 153, equally spaced around the circumference of the collar 151, are required for balanced loading. In Fig. 25, the pairs of arms 153 are spaced 90° apart so that two pairs can be shown for convenience of illustration.

Rocker arms 154 are pivoted between the ends of respective pairs of arms 153. On one end of each rocker arm 154, a roller 155 bears against wheel 81-2; on the other end, a roller 156 bears against the flange of a flanged sleeve 157. This flanged sleeve is free to slide axially along sleeve 149, but is forced toward collar 151 by a spring 85-2 which acts in compression between sleeve 157 and collar 152.

In this embodiment, when reaction friction ring 89-2 is shifted toward friction ring 93-2, the reduction of speed between input shaft 82-2 and output shaft 95-2 increases. This is opposite to the action of the embodiment of Fig. 16. When such a shift is made the point of contact between surface 147 and friction ring 93-2 moves closer to the axis of roller 88-2, which is desirable in effecting the change in reduction ratio. At the same time, a plane tangent to these contacting surfaces at this point of contact makes a greater angle with the axis of roller 88-2. This causes the axial force acting at this point of contact to increase with respect to the radial force.

If this increased axial force is transmitted to the point of contact between surface 146 and reaction friction ring 89-2, it will cause the radial force at this contact point to increase, since the angle of contact at this point remains constant. This is advantageous for two reasons.

During this action, the contact point between friction ring 89-2 and surface 146 moves toward the section of roller 88-2 that contacts roller 79-2, and, if the radial force at the said contact point is made to increase in the proper ratio as it shifts axially on roller 88-2, the resultant radial force with which roller 88-2 bears on rollers 79-2 remains close to the longitudinal center of such rollers. This eliminates the necessity for axial components of forces being transmitted through the contacts between rollers 88-2 and rollers 79-2.

At the same time, as the contact point between friction ring 89-2 and surface 146 moves to a larger diameter on such surface, this contact point can support a greater load because of the reduced relative curvature of the contacting surfaces. Such a greater normal force is required, because of the increased reaction friction load at reduced ratio.

As this shift of the reaction friction ring 89-2 toward friction ring 93-2 takes place, rollers 79-2 shift toward shaft 82-2 causing wheels 80-2 and 81-2 to move farther apart. As this action takes place, the points of contact between surfaces 148 on rollers 79–2 and the surfaces of friction rings 83–2 and 84–2 shift to greater radius on rollers 79–2, and the planes tangent to the contacting surfaces at the points of contact make lesser angles with the axes of the respective rollers 79–2. The radial shift of the contact points keeps the velocity of translation of the rollers from becoming too high at the increased ratios of speed reduction, but the decreasing angle of contact causes an increase in the ratio of normal force to axial force at these contact points as wheels 80–2 and 81–2 are moved farther apart. The normal force should not vary greatly, since the torque to be transmitted by the driving wheels 80–2 and 81–2 remains relatively constant in the usual application.

It is therefore desirable to make the axial forces applied to the wheels 80–2 and 81–2 decrease as the wheels are moved farther apart. This is the purpose of the modified method of applying axial thrust to these wheels.

The spring 85–2 bears more heavily on flanged sleeve 157 as wheel 81–2 is moved away from wheel 80–2, but, because of the changing ratio of moment arms on the rocker arms 154, the axial force which roller 155 applies to wheel 81–2 actually decreases as these two wheels are moved apart. Thus, the arrangement shown reverses the effect of the normal variation in thrust of spring 85–2 during flexure thereof.

The cumulative result of these modifications is that, in this embodiment of Fig. 25, the velocity with which the column of rollers moves around the axis of the transmission is greatest when the greatest speed reduction between input and output shafts is taking place. This allows centrifugal force on the rollers to contribute to the additional force required between the rollers and the outer friction rings at such reduction ratios. Better maintenance of normal forces and better balance of axial forces on the rollers is obtained in this embodiment than in the embodiment of Fig. 16.

As will be seen from the drawing, it is preferable to elongate the outer rollers 88–2 relative to the inner rollers 79–2 and to enlarge in diameter the set of ends presenting convexly curved surfaces 147 to facilitate the obtaining of a 1:1 drive ratio.

The present application is a continuation-in-part of my similarly entitled, copending, allowed application Serial Number 612,506, filed September 27, 1956 and now abandoned.

Whereas this invention is here illustrated and described with respect to specific embodiments thereof, it should be realized that changes may be made within the scope of the following claims, without departing from the essential contributions to the art made by the teachings hereof.

I claim:

1. A power transmission mechanism of friction drive type, comprising two mutually independent shafts; structure rotatably mounting said shafts; means defining a raceway encircling the axes of said shafts, said means including friction drive means operatively associated with one of said shafts, friction driven means operatively associated with the other of said shafts, and friction reaction means; a multiplicity of rolling elements arranged in endless loop formation within said raceway and in radially progressive, multilayer formation relative to the axes of said shafts, so that none of the said rolling elements in any single layer contacts another in that layer but each contacts a pair of said rolling elements in the next layer or layers, contact between any two rolling elements taking place at at least two points aligned substantially in parallel with the axes of said shafts and lying on the rolling surfaces of such rolling elements substantially equidistant radially from respective axes of symmetry of such rolling elements; said friction drive means, said friction driven means, and said friction reaction means each being disposed in contact with rolling elements of a layer of rolling elements, at least two layers of rolling elements being involved in these contacts, considering the latter collectively; and means imposing a compaction load on the rolling elements, to insure collective action thereof as a continuously traveling, power transmitting column.

2. The power transmission mechanism of claim 1, wherein at least those rolling elements that contact the friction means are elongate rollers.

3. The power transmission mechanism of claim 2, wherein the two shafts are axially aligned, end to end.

4. The power transmission mechanism of claim 3, wherein the friction drive means and the friction driven means are provided by respective wheels secured to the two shafts, respectively, for rotation therewith, said wheels having smooth, roller-contacting rims.

5. The power transmission mechanism of claim 4, wherein the friction reaction means comprise circular elements having smooth, roller-contacting rims, respectively.

6. The power transmission mechanism of claim 5, wherein the structure rotatably mounting the shafts is a transmission housing enclosing the working parts of the transmission; and one of the friction reaction elements is attached to said housing and is fixed against movement along the axes of said shafts.

7. The power transmission mechanism of claim 6, wherein another of the friction reaction elements is movable longitudinally of the axes of the shafts; and means are provided for shifting it back and forth along said axes.

8. The power transmission mechanism of claim 7, wherein the wheels and the friction reaction elements contact the rollers at respective ends of the latter; and the axially movable reaction element contacts the rollers of one of the layers diagonally opposite contact of the rollers of another layer by one of the wheels, such wheel being also movable longitudinally of the axes of the shafts.

9. The power transmission mechanism of claim 8, wherein the compaction loading means exerts its compacting force against such axially movable wheel.

10. The power transmisison mechanism of claim 9, wherein the individual rollers making up one layer of such rollers are interengaged with the individual rollers making up an adjacent contacting layer, the interengagement being accomplished by means of annular tongues and grooves formed on the respective rollers.

11. The power transmission mechanism of claim 10, wherein opposite end portions of the respective rollers of friction-contacted layers converge outwardly of said rollers, for rolling contact with the smooth rim surfaces of the corresponding wheels and reaction elements, respectively.

12. The power transmission mechanism of claim 11, wherein the individual rollers of the respective layers frictionally contact one another by means of relatively narrow cylindrical band areas.

13. The power transmission mechanism of claim 12, wherein the rollers of one of two mutually contacting layers are provided with relief grooves flanking the respective cylindrical band areas and determining the widths of the latter.

14. The power transmission mechanism of claim 1, wherein at least those rolling elements that contact the friction means are elongate rollers; the two shafts are axially aligned, end to end; the structure mounting said shafts is a transmission housing enclosing the working parts of the transmission; the friction drive means and the friction driven means are provided by respective wheels secured to said two shafts, respectively, for rotation therewith, said wheels having smooth, roller-contacting rims; the friction reaction means comprise circular elements having smooth, roller-contacting rims, respectively, one of the reaction elements being attached to said housing and fixed against movement along the axes of said shafts, and the other reaction element being movable longitudinally of the axes of said shafts; means are provided for shifting such movable reaction element back and forth along siad axes; the wheels and the reaction elements contact the rollers at respective ends of the latter, the axially movable reaction element contacting the rollers of one of the layers diagonally opposite contact of the rollers of another layer by one of the wheels and such wheel being also movable longitudinally of the axes of the shafts; such axially movable wheel has an axially movable splined connection with the shaft on which it is mounted, said connection including a splined sleeve having internal and external splines of opposite hand, respectively, said connection forming part of the compaction loading means; and there is provided, as part of the compaction loading means, a spring reactive between said connector sleeve and the transmission housing.

15. The power transmission mechanism of claim 14, wherein mutually engageable friction means are provided on adjoining end portions of the connector sleeve and the other shaft, respectively, providing for direct drive lock-out.

16. The power transmission mechanism of claim 15, wherein the adjoining end portion of the other shaft is of bell formation, with the interior surface of its open end beveled outwardly; and the adjoining end portion of the connector sleeve is dimensioned to fit within said bell formation and has its exterior surface beveled inwardly for mating in frictional locking relationship with the outwardly beveled surface of said bell formation.

17. The power transmission mechanism of claim 16, wherein the shaft on which the axially movable wheel is mounted has its terminus in the transmission housing journaled within the bell formation of the other shaft.

18. The power transmission mechanism of claim 1, wherein at least those rolling elements that contact the friction means are elongate rollers; the two shafts are axially aligned, end to end; the structure mounting said shafts is a transmission housing enclosing the working parts of the transmission; the friction drive means and the friction driven means are provided by respective wheels secured to said two shafts, respectively, for rotation therewith, said wheels having smooth-surfaced rims engaging the innermost layer of rollers in frictional running contact with respective opposite ends of the rollers thereof; the friction reaction means are provided by respective rings secured to said transmission housing in encircling relationship with the column of rollers and having smooth inner rim surfaces engaging the outermost layer of rollers in frictional running contact with respective opposite ends of the rollers thereof, one of said wheels being movable axially of said shafts, and that friction reaction ring which is disposed diagonally opposite such axially movable wheel being slidable back and forth within said tranmission housing axially of said shafts; there is provided a carriage and ring gear assembly to which said friction reaction ring is secured, the carriage and that portion of the transmission housing along which it travels being mutually interengaged by screw threading having an axis coincident with the axes of said shafts; there is provided means for rotating said ring gear in one direction or the other to move said carriage and ring assembly and said friction reaction ring backwardly or forwardly, axially; there is provided keyway and key means securing said friction reaction ring to said transmission housing and against rotation; and the compaction loading means comprises thrust means reactive against said axially movable wheel in the direction of the roller column.

19. The power transmission mechanism of claim 1, wherein the rolling elements making up the layers are rollers; there are more than two layers of said rollers; the rollers of the innermost layer and of the outermost layer are elongate and have their opposite end portions convergent outwardly thereof for rolling contact with corresponding friction means; the individual rollers making up a layer of such rollers are interengaged with the individual rollers making up an adjacent contacting layer, the interengagement being accomplished by means of annular tongues and grooves formed on the respective rollers; and the rollers of intermediate layers are of relatively short spool formation.

20. The power transmission mechanism of claim 1, wherein at least those rolling elements that contact the friction means are elongate rollers; the friction drive means comprise two wheels mounted in mutually spaced relationship on one of the shafts in friction contact relationship with respectively opposite ends of the rollers of the innermost layer of same; and the friction driven means comprises a wheel of greater diameter than said two wheels and mounted on the other shaft.

21. The power transmission mechanism of claim 1, wherein at least those rolling elements that contact the friction means are elongate rollers; the friction drive means and the friction driven means include a pair of wheels, mounted in mutually spaced relationship on one of the shafts for rotation therewith and having smooth-surfaced rims in frictional running contact with opposite sets of end portions, respectively, of the rollers of the innermost layer, and a wheel of larger diameter than the wheels of said pair and mounted on the other of said shafts for rotation therewith, said wheel having a smooth-surfaced rim in frictional running contact with one set of end portions of the rollers of the outermost layer; the friction reaction means comprises a circular element having a smooth-surfaced rim in frictional running contact with the other set of end portions of the rollers of the outermost layer; and the compaction loading means includes a spring reactive between said wheel and that wheel of said pair of wheels which is adjacent thereto, the latter wheel being free to move axially of its shaft.

22. The power transmission mechanism of claim 21, wherein the wheel of larger diameter is splined on its shaft by means of a connector sleeve having external helical splines directed to transmit thrust from said wheel of larger diameter to that wheel of the pair of wheels which is adjacent thereto, said shaft being the output shaft of the transmission.

23. The power transmission mechanism of claim 1, wherein at least those rolling elements that contact the friction means are elongate rollers; the friction drive means and the friction driven means include a pair of wheels, mounted in mutually spaced relationship on one of the shafts for rotation therewith and having smooth-surfaced rims in frictional running contact with opposite sets of end portions, respectively, of the rollers of the innermost layer, and a wheel of larger diameter than the wheels of said pair and mounted on the other of said shafts for rotation therewith, said wheel having a smooth-surfaced rim in frictional running contact with one set of end portions of the rollers of the outermost layer; the friction reaction means comprises a circular element having a smooth-surfaced rim in frictional running contact with the other set of end portions of the rollers of the outermost layer; the compaction loading means includes a spring reactive between said wheel and that wheel of said pair of wheels which is adjacent thereto, the latter wheel being free to move axially of its shaft, the said pair of wheels being splined on their shaft by means of a connector sleeve having external helical splines of mutually opposite hand extending along respectively opposite end portions thereof; and means anchoring the other wheel of said pair of wheels to the shaft on which they are mounted, the latter being the output shaft of the transmission.

24. The power transmission mechanism of claim 1, wherein the two shafts are spaced apart side by side in mutually parallel relationship; the structure rotatably mounting the shafts is a transmission housing enclosing the working parts of the transmission and defining an endless loop channel encircling the said shafts transversely of their axes; the friction drive means and the friction driven means comprise respective wheels fixed on said shafts, respectively, for rotation therewith, said wheels being disposed within respectively opposite ends of said endless loop channel and having smooth-surfaced rims which, together with said transmission housing, define the endless loop raceway; the rolling elements of the innermost layer are elongate rollers; and there are provided, internally of said transmission housing and fixed thereto, mutually opposite sets of trackway supports for respective opposite ends of said elongate rollers, the supports of each of said sets projecting inwardly of said raceway at opposite sides thereof, and said sets having their said supports extending along transition zones which extend from transmission housing portions, that contribute to defining the inner periphery of said raceway, to one of said wheels, and vice versa, respectively, the trackway surfaces of said supports being contoured to follow the paths of the instant centers of the motion of said rollers along said transition zones.

25. The power transmission mechanism of claim 24, wherein the other of the wheels is encircled by an annular series of rollers which includes spacer means rigidly typing the individual rollers together in freely rotatable condition but predetermined spacing relative to one another, said rollers being in frictional running contact with the rim of said other of the wheels and with the elongate rollers of the innermost layer.

26. The power transmission mechanism of claim 25, wherein the compaction loading means comprises elongate plate springs disposed in respective reacting positions between the transmission housing and the proximate layer of rollers in the column of rollers.

27. A power transmission mechanism of friction drive type, comprising two mutually independent rotatable elements; structure rotatably mounting said elements; means defining a raceway encircling the axes of said elements, said means including friction drive means operatively associated with one of said elements, friction driven means operatively associated with the other of said elements, and friction reaction means; a multiplicity of rolling elements arranged in endless loop formation within said raceway and in radially progressive, multilayer formation relative to the axes of said rotatable elements, so that none of the said rolling elements in any single layer contacts another in that layer but each contacts a pair of said rolling elements in the next layer or layers, contact between any two rolling elements taking place at at least two points aligned substantially in parallel with the axes of said roatable elements and lying on the rolling surfaces of said rolling elements substantially equidistant radially from respective axes of symmetry of such rolling elements; said friction drive means, said friction driven means, and said friction reaction means each being disposed in contact with rolling elements of a layer of rolling elements, at least two layers of rolling elements being involved in these contacts, considering the latter collectively; means imposing a compaction load on the rolling elements, to insure collective action thereof as a continuously traveling, power transmitting column; power input means connected to one of said rotatable elements; and power output means connected to the other of said rotatable elements.

28. The power transmission mechanism of claim 27, wherein one of the rotatable elements is a shaft and the other is the hub of a wheel; the structure rotatably mounting said elements includes a transmission housing enclosing the working parts of the transmission and a stationary shaft projecting internally thereof from fixed securement thereto, the rotatable shaft being journaled in said housing and the said hub of the wheel being journaled on said stationary shaft; the friction drive means and the friction driven means comprise a pair of smooth-rimmed wheels mounted in mutually spaced relationship on said rotatable shaft for rotation therewith and a pair of smooth-surfaced rims for the said wheel having said hub, said rims being spaced apart transversely of and facing the axis of said wheel and said wheel being of greater diameter than the wheels of said pair, one of the wheels of said pair of wheels being movable axially of said rotatable shaft and one of said rims being movable axially of said wheel; the friction reaction means comprises a pair of smooth-rimmed circular elements supported in mutually spaced, non-rotatable positions within said transmission housing, one of the circular elements of said pair being secured to said transmission housing for movement axially of said shafts and the other being fixedly secured to said stationary shaft; the rolling elements that contact the friction means are elongate rollers; a layer of said elongate rollers has opposite end portions of its rollers in frictional running contact, respectively, with the rims of the wheels of said pair of wheels; another layer has opposite end portions of its rollers in frictional running contact, respectively, with the rims of said wheel having said hub; another layer has opposite end portions of its rollers in frictional running contact, respectively, with the rims of the circular elements of said pair of circular elements; and there is provided means for shifting the position of the axially movable circular element.

29. The power transmission mechanism of claim 28, wherein the rotatable shaft constitutes the power input means; and the power output means comprises a second rotatable shaft rotatably mounted in the transmission housing, and gear means interconnecting the wheel having said hub with said second rotatable shaft, in drive and driven relationship, respectively.

30. The power transmission mechanism of claim 29, wherein the compaction loading means comprises a finger spring reactive between said hub and the axially movable rim of the wheel having said hub.

31. In a power transmission mechanism, a multilayer column of rolling elements, none of said rolling elements in any single layer contacting one another but each contacting a pair of the rolling elements in the next layer or layers; a plurality of surfaces each in contact with rolling elements of one of the layers of said column, said surfaces defining, at least in part, a path for translation of the rolling elements of said column, at least one of said surfaces being movable in a direction of translation of said rolling elements and serving as a friction driving means to impart movement thereto, and at least another of said surfaces being similarly movable and serving as a friction driven means to take power from said column of rolling elements, the several layers of said multilayer column being arranged in series progression so that all rolling elements thereof which contact a surface of said plurality of surfaces intersect a common plane.

32. The power transmission mechanism of claim 31, wherein means are provided for restraining the movement of at least another surface of said plurality of surfaces, so that it will serve as a friction reaction means imparting torque to said rolling elements.

33. The power transmission mechanism of claim 32, wherein the rolling elements of at least one layer of the column of same are elongate rollers having outwardly convergent ends; and wherein at least three surfaces of the plurality of surfaces co-operate to define at least a portion of the path of translation of the rolling elements of said multilayer column, at least one set of two of said at least three surfaces contacting said outwardly convergent ends of said elongate rollers at respective opposite ends of said rollers.

34. A power transmission mechanism, comprising a multilayer column of rolling elements, none of said rolling elements in any single layer contacting one another but each contacting a pair of the rolling elements in the next layer or layers, and the rolling elements of at least one layer being elongate rollers having outwardly convergent ends; a plurality of surfaces each in contact with rolling elements of one of the layers of said column, said surfaces defining, at least in part, a path for translation of the rolling elements of said column, at least one of said surfaces being movable in a direction of translation of said rolling elements and serving as a friction driving means to impart movement thereto, at least another of said surfaces being similarly movable and serving as a friction driven means to take power from said column of rolling elements, at least three surfaces of said plurality co-operating to define at least a particular portion of said path of translation, at least one set of two of said at least three surfaces contacting said outwardly convergent ends of the elongate rollers at respective opposite ends of the latter, and at least one of the surfaces of the said at least one set being shiftable in a direction transverse to the direction of motion of said column; and means for shifting said shiftable surface.

35. The power transmission mechanism of claim 34, wherein is provided means for applying force to a shiftable surface of a set, in the direction of the other surface of said set, for compacting said multilayer column.

36. The power transmission mechanism of claim 34, wherein the outward convergence of each of the ends of at least one set of ends of said elongate rollers defines a conical surface; and wherein the surface which contacts said set of ends is a rounded corner.

37. The power transmission mechanism of claim 34, wherein the outward convergence of each of the ends of at least one set of ends of said elongate rollers defines a longitudinally rounded, annular surface at the contact with one of said at least one set of surfaces; and wherein such one surface makes an oblique angle with the axes of said elongate rollers.

38. The power transmission mechanism of claim 34, wherein the outward convergence of each of the ends of at least one set of ends of said elongate rollers defines a longitudinally curved, annular surface; and wherein the surface of said at least one set of surfaces which contacts said longitudinally curved, annular surface is curved along its intersection with a plane that is perpendicular to the direction of translation of the contacting elongate roller and passes through the contact therewith.

39. A mechanism, comprising a multilayer column of rolling elements arrangement for translation; a surface in contact with rolling elements of one of the layers of said column and movable in a direction of translation of the rolling elements which it contacts; and a surface in contact with rolling elements of another of the layers of said column, none of the rolling elements in any single layer contacting one another but each contacting a pair of the rolling elements in the next layer or layers, and the surfaces defining, at least in part, a path for translation of said rolling elements, the several layers of said multilayer column being arranged in series progression so that all rolling elements thereof which contact a surface of said surfaces intersect a common plane.

40. The mechanism of claim 39, wherein means are provided for moving the movable surface; and means are provided for restraining movement of the other surface in the direction of movement of said movable surface.

41. The power transmission mechanism of claim 27, wherein the two points of contact are mutually spaced apart.

42. The power transmission mechanism of claim 27, wherein the two points of contact are mutually spaced apart along a continuous line of contact between the two rolling elements.

43. The power transmission mechanism of claim 27, wherein the two points of contact are mutually spaced apart at respectively opposite sides of clearance between the two rolling elements.

44. A power transmission mechanism of friction drive type, comprising two mutually independent rotatable elements; structure rotatably mounting said elements; means defining a raceway encircling the axes of said elements, said means including friction drive means operatively associated with one of said elements, friction driven means operatively associated with the other of said elements, and friction reaction means; a multiplicity of rolling elements arranged in endless loop formation within said raceway and in radially progressive, multilayer formation relative to the axes of said rotatable elements, so that none of the said rolling elements in any single layer contacts another in that layer but each contacts a pair of said rolling elements in the next layer or layers and so that all rolling elements which contact a friction means intersect a common plane; said friction drive means, said friction driven means and said friction reaction means each being disposed in contact with rolling elements of a layer of rolling elements, at least two layers of rolling elements being involved in these contacts, considering the latter collectively; means imposing a compaction load on the rolling elements, to insure collective action thereof as a continuously traveling, power transmitting column; power input means connected to one of said rotatable elements; and power output means connected to the other of said rotatable elements.

45. The power transmission mechanism of claim 1, wherein at least those rolling elements that contact the friction means are elongate rollers, the end portions of the rollers of one layer being tapered, each end portion of one set of said end portions being longitudinally convexly curved and the friction means which contacts them being concavely curved longitudinally of the rollers, each end portion of the other set of said end portions being substantially frusto-conical in shape and the friction means which contacts them being convexly curved longitudinally of the rollers.

46. The power transmission of claim 45, wherein the means imposing a compaction load on the rolling elements comprises a spring disposed to urge a friction means contacting one set of end portions of the rollers of a layer of rollers toward the friction means contacting the opposite set of ends of said rollers; and thrust-transmitting means constructed and arranged to reverse the effect of normal variation in thrust during flexure of said spring.

47. The power transmission of claim 1, wherein the means imposing a compaction load on the rolling elements comprises a spring disposed to urge a friction means contacting one set of end portions of the rollers of a layer of rollers toward the friction means contacting the opposite set of ends of said rollers; and thrust-transmitting means constructed and arranged to reverse the effect of normal variation in thrust during flexure of said spring.

References Cited in the file of this patent

UNITED STATES PATENTS

| 2,205,768 | Pearce | June 25, 1940 |
| 2,696,888 | Chillson et al. | Dec. 14, 1954 |
| 2,703,992 | Hine et al. | Mar. 15, 1955 |

FOREIGN PATENTS

| 95,797 | Austria | Jan. 25, 1924 |
| 934,923 | Germany | Nov. 10, 1955 |